United States Patent
Smeenge et al.

(10) Patent No.: US 7,953,617 B2
(45) Date of Patent: May 31, 2011

(54) GOLF COURSE TIME MANAGEMENT SYSTEM

(75) Inventors: Paul A. Smeenge, Grand Rapids, MI (US); Jeffrey R. Smeenge, Oxford, MI (US)

(73) Assignee: Visual Golf Solutions, LLC, Grand Rapids, MI (US)

( * ) Notice: Subject to any disclaimer, the term of this patent is extended or adjusted under 35 U.S.C. 154(b) by 200 days.

(21) Appl. No.: 12/368,596

(22) Filed: Feb. 10, 2009

(65) Prior Publication Data

US 2009/0210263 A1 Aug. 20, 2009

Related U.S. Application Data

(60) Provisional application No. 61/029,804, filed on Feb. 19, 2008.

(51) Int. Cl.
  *G06Q 10/00* (2006.01)
  *A63B 57/00* (2006.01)
  *A63B 69/36* (2006.01)
  *A63B 67/02* (2006.01)
(52) U.S. Cl. .................... 705/5; 473/131; 473/150
(58) Field of Classification Search .................. 705/5
  See application file for complete search history.

(56) References Cited

U.S. PATENT DOCUMENTS

| | | | |
|---|---|---|---|
| 5,086,390 A * | 2/1992 | Matthews | ............ 700/91 |
| 5,524,081 A | 6/1996 | Paul | |
| 5,685,786 A | 11/1997 | Dudley | |
| 5,689,431 A | 11/1997 | Rudow et al. | |
| 5,740,077 A | 4/1998 | Reeves | |
| 5,878,369 A | 3/1999 | Rudow et al. | |
| 6,033,316 A * | 3/2000 | Nixon | ............ 473/131 |
| 6,186,908 B1 | 2/2001 | Kawasaki et al. | |
| 6,236,360 B1 | 5/2001 | Rudow et al. | |
| 6,236,940 B1 | 5/2001 | Rudow et al. | |
| 6,348,007 B2 | 2/2002 | Kawasaki et al. | |
| 6,470,242 B1 | 10/2002 | Rudow et al. | |
| 6,525,690 B2 | 2/2003 | Rudow et al. | |
| 7,121,962 B2 | 10/2006 | Reeves | |
| 2002/0016674 A1 | 2/2002 | Rudow et al. | |
| 2002/0082122 A1 | 6/2002 | Pippin et al. | |
| 2002/0087223 A1 | 7/2002 | Moffatt et al. | |
| 2004/0064206 A1 | 4/2004 | Kim | |

(Continued)

OTHER PUBLICATIONS

Website entitled "EZLinks.com—Online Tee Times Made EZ," available at www.ezlinks.com/courseOp_ps_ttn.asp, which should be considered prior art to the present application under 35 USC 102(a). copyright 2009.

(Continued)

*Primary Examiner* — John W Hayes
*Assistant Examiner* — David J Clark
(74) *Attorney, Agent, or Firm* — Van Dyke, Gardner, Linn & Burkhart, LLP

(57) ABSTRACT

A system is provided for tracking and visually displaying golf reservations in a computer-implemented environment. The system provides a display with a grid or array of times arranged according to golf hole numbers. A reservation designator, by its location on the grid, identifies a start time and start hole, and includes an identifier to identify one or more golfers corresponding to a reservation. The duration of the game associated with reservation designator is estimated based upon golf course parameters. The reservation designator thus visually indicates a predicted location of the players corresponding to a golf game reservation. Additionally, the system may provide for tracking and sales of green fees and merchandise.

25 Claims, 22 Drawing Sheets

U.S. PATENT DOCUMENTS

| | | | |
|---|---|---|---|
| 2004/0203410 A1 | 10/2004 | Kim | |
| 2004/0243262 A1* | 12/2004 | Hofmann | 700/91 |
| 2006/0089845 A1* | 4/2006 | Marcell et al. | 705/1 |
| 2007/0129178 A1 | 6/2007 | Reeves | |
| 2007/0135237 A1 | 6/2007 | Reeves | |
| 2007/0207872 A1* | 9/2007 | Last | 473/131 |
| 2008/0120157 A1* | 5/2008 | Foster | 705/8 |
| 2009/0094072 A1* | 4/2009 | Rodenberg | 705/5 |

OTHER PUBLICATIONS

Website entitled "Leading Edge-Golf, Restaurant, Retail, and Margin Management Software," copyright 2005, available at www.jointheedge.com/tee_sheet_operations.html.

Brochure by Leading Edge, entitled "Golf Management System," published on or before Jan. 2008.

Website entitled "Fore! Reservations-Reservations," copyright 1995-2007, available at http://sales.teeitup.com.

Website entitled "Fore! Reservations—Tee Sheet Reports," copyright 1995-2007, available at http://sales.teeitup.com.

Website entitled "BUZ Software—Tee Sheet," copyright 2000-2009, available at www.buzsoftware.com/index.cfm?ID=109.

Sample screenshots obtained from Buz Software website, publication date unknown, available at www.buzsoftware.com.

Website entitled "Golf Course Tee Sheet Reservations System and Tee Time Software . . . " publication date unknown, available at www.activegolfsolutions.com.

Brochure by Active Golf, entitled "Overview", published on or before Jan. 2008.

Website entitled "Course Availability—Abacus 21," copyright 2009, available at http://www.abacus21.com.

Brochure by Abacus 21, entitled "Club and Resort Management Systems," published on or before Jan. 2008.

Brochure by Chelsea Information Systems, Inc., entitled "Tee Time Reservation System . . . ," published on or before Jan. 2008.

Website entitled "Chelsea Information Systems—Golf," publication date unknown, available at http://www.chelseainfo.com.

Sample screenshots obtained from Chelsea Information Systems website, publication date unknown, available at http://www.chelseainfo.com.

Brochure by Club Prophet Systems, entitled "Starter Hut Tee Sheet," published on or before Jan. 2008.

Website entitled "Club Prophet Systems :: Tee Sheet," publication date unknown, available at http://www.clubprophetsystems.com.

Brochure by Crescent Systems entitled "Systems Overview," published on or before Jan. 2008.

Website entitled "Tee-Time Management," publication date unknown, available at www.crescentsystems.com.

Brochure by ForeTees, entitled "Online Tee Sheet and First Tee Management Solutions for Private Clubs," published on or before Jan. 2008.

Brochure by GolfNet, entitled "The Leading Partner in Golf Program Management," published on or before Jan. 2008.

Brochure by Jencess, entitled "QuickStart 500," published on or before Jan. 2008.

Brochure by SPS, entitled "Golf Management Solutions," published on or before Jan. 2008.

Website entitled "SPS Golf Management Solutions—Reservation Tee Sheet," copyright 2000-2008, available at http://www.golfgopher.com.

Brochure by Vermont Systems, entitled "GolfTrac Golf Course Point of Sale Software," published on or before Jan. 2008.

Website entitled "IBS Private Courses," copyright 2008, available at http://www.goibs.com.

Website entitled "Handicomp, Inc.—Golf Handicapping Software, Golf Club and Pro Shop Software, POS, . . . ," publication date unknown, available at http://www.handicomp.com.

* cited by examiner

FIGURE 2B

| 1 | 2 | 3 | 4 | 5 | 6 | 7 | 8 | 9 | 10 | 11 | 12 | 13 | 14 | 15 | 16 | 17 | 18 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|---|---|---|---|---|---|---|---|---|---|---|---|---|---|---|---|
| 10:30 | 10:45 | 11:00 | 11:15 | 11:30 | 11:45 | 12:00 | 12:15 | 12:30 | 12:45 | 1:00 | 1:15 | 1:30 | 1:45 | 2:00 | 2:15 | 2:30 | 2:45 | 3:00 | 3:15 | 3:30 | 3:45 | 4:00 | 4:15 | 4:30 | 4:45 | 5:00 | 5:15 | 5:30 | 5:45 | 6:00 | 6:15 | 6:30 | 6:45 | 7:00 | 7:15 |
| 10:40 | 10:55 | 11:10 | 11:25 | 11:40 | 11:55 | 12:10 | 12:25 | 12:40 | 12:55 | 1:10 | 1:25 | 1:40 | 1:55 | 2:10 | 2:25 | 2:40 | 2:55 | 3:10 | 3:25 | 3:40 | 3:55 | 4:10 | 4:25 | 4:40 | 4:55 | 5:10 | 5:25 | 5:40 | 5:55 | 6:10 | 6:25 | 6:40 | 6:55 | 7:10 | 7:25 |
| 10:50 | 11:05 | 11:20 | 11:35 | 11:50 | 12:05 | 12:20 | 12:35 | 12:50 | 1:05 | 1:20 | 1:35 | 1:50 | 2:05 | 2:20 | 2:35 | 2:50 | 3:05 | 3:20 | 3:35 | 3:50 | 4:05 | 4:20 | 4:35 | 4:50 | 5:05 | 5:20 | 5:35 | 5:50 | 6:05 | 6:20 | 6:35 | 6:50 | 7:05 | 7:20 | 7:35 |
| 11:00 | 11:15 | 11:30 | 11:45 | 12:00 | 12:15 | 12:30 | 12:45 | 1:00 | 1:15 | 1:30 | 1:45 | 2:00 | 2:15 | 2:30 | 2:45 | 3:00 | 3:15 | 3:30 | 3:45 | 4:00 | 4:15 | 4:30 | 4:45 | 5:00 | 5:15 | 5:30 | 5:45 | 6:00 | 6:15 | 6:30 | 6:45 | 7:00 | 7:15 | 7:30 | 7:45 |
| 11:10 | 11:25 | 11:40 | 11:55 | 12:10 | 12:25 | 12:40 | 12:55 | 1:10 | 1:25 | 1:40 | 1:55 | 2:10 | 2:25 | 2:40 | 2:55 | 3:10 | 3:25 | 3:40 | 3:55 | 4:10 | 4:25 | 4:40 | 4:55 | 5:10 | 5:25 | 5:40 | 5:55 | 6:10 | 6:25 | 6:40 | 6:55 | 7:10 | 7:25 | 7:40 | 7:55 |
| 11:20 | 11:35 | 11:50 | 12:05 | 12:20 | 12:35 | 12:50 | 1:05 | 1:20 | 1:35 | 1:50 | 2:05 | 2:20 | 2:35 | 2:50 | 3:05 | 3:20 | 3:35 | 3:50 | 4:05 | 4:20 | 4:35 | 4:50 | 5:05 | 5:20 | 5:35 | 5:50 | 6:05 | 6:20 | 6:35 | 6:50 | 7:05 | 7:20 | 7:35 | 7:50 | 8:05 |
| 11:30 | 11:45 | 12:00 | 12:15 | 12:30 | 12:45 | 1:00 | 1:15 | 1:30 | 1:45 | 2:00 | 2:15 | 2:30 | 2:45 | 3:00 | 3:15 | 3:30 | 3:45 | 4:00 | 4:15 | 4:30 | 4:45 | 5:00 | 5:15 | 5:30 | 5:45 | 6:00 | 6:15 | 6:30 | 6:45 | 7:00 | 7:15 | 7:30 | 7:45 | 8:00 | 8:15 |
| 11:40 | 11:55 | 12:10 | 12:25 | 12:40 | 12:55 | 1:10 | 1:25 | 1:40 | 1:55 | 2:10 | 2:25 | 2:40 | 2:55 | 3:10 | 3:25 | 3:40 | 3:55 | 4:10 | 4:25 | 4:40 | 4:55 | 5:10 | 5:25 | 5:40 | 5:55 | 6:10 | 6:25 | 6:40 | 6:55 | 7:10 | 7:25 | 7:40 | 7:55 | 8:10 | 8:25 |
| 11:50 | 12:05 | 12:20 | 12:35 | 12:50 | 1:05 | 1:20 | 1:35 | 1:50 | 2:05 | 2:20 | 2:35 | 2:50 | 3:05 | 3:20 | 3:35 | 3:50 | 4:05 | 4:20 | smif | stub | brow | dee | 5:35 | 5:50 | 6:05 | 6:20 | 6:35 | 6:50 | 7:05 | 7:20 | 7:35 | 7:50 | 8:05 | 8:20 | 8:35 |
| 12:00 | 12:15 | 12:30 | 12:45 | 1:00 | 1:15 | 1:30 | 1:45 | 2:00 | 2:15 | 2:30 | 2:45 | 3:00 | 3:15 | 3:30 | 3:45 | 4:00 | 4:15 | 4:30 | rally | pres | aller | betti | 5:45 | 6:00 | 6:15 | 6:30 | 6:45 | 7:00 | 7:15 | 7:30 | 7:45 | 8:00 | 8:15 | 8:30 | 8:45 |
| 12:10 | 12:25 | 12:40 | 12:55 | 1:10 | 1:25 | 1:40 | 1:55 | 2:10 | 2:25 | 2:40 | 2:55 | 3:10 | 3:25 | 3:40 | 3:55 | 4:10 | 4:25 | 4:40 | tuba | saef | grey | best | 5:55 | 6:10 | 6:25 | 6:40 | 6:55 | 7:10 | 7:25 | 7:40 | 7:55 | 8:10 | 8:25 | 8:40 | 8:55 |
| 12:20 | 12:35 | 12:50 | 1:05 | 1:20 | 1:35 | 1:50 | 2:05 | 2:20 | 2:35 | 2:50 | 3:05 | 3:20 | 3:35 | 3:50 | 4:05 | 4:20 | 4:35 | 4:50 | 5:00 | 5:15 | 5:30 | 5:45 | 6:00 | 6:15 | 6:30 | 6:45 | 7:00 | 7:15 | 7:30 | 7:45 | 8:00 | 8:15 | 8:30 | 8:45 | 9:05 |
| 12:30 | 12:45 | 1:00 | 1:15 | 1:30 | 1:45 | 2:00 | 2:15 | 2:30 | 2:45 | 3:00 | 3:15 | 3:30 | 3:45 | 4:00 | 4:15 | 4:30 | 4:45 | 5:00 | 5:15 | 5:30 | 5:45 | 6:00 | 6:15 | 6:30 | 6:45 | 7:00 | 7:15 | 7:30 | 7:45 | 8:00 | 8:15 | 8:30 | 8:45 | 9:00 | 9:05 |
| 12:40 | 12:55 | 1:10 | 1:25 | 1:40 | 1:55 | 2:10 | 2:25 | 2:40 | 2:55 | 3:10 | 3:25 | 3:40 | 3:55 | 4:10 | 4:25 | 4:40 | 4:55 | 5:10 | 5:25 | 5:40 | 5:55 | 6:10 | 6:25 | 6:40 | 6:55 | 7:10 | 7:25 | 7:40 | 7:55 | 8:10 | 8:25 | 8:40 | 8:55 | 9:10 | 9:05 |
| 12:50 | 1:05 | 1:20 | 1:35 | 1:50 | 2:05 | 2:20 | 2:35 | 2:50 | 3:05 | 3:20 | 3:35 | 3:50 | 4:05 | 4:20 | 4:35 | 4:50 | 5:05 | 5:20 | 5:35 | 5:50 | 6:05 | 6:20 | 6:35 | 6:50 | 7:05 | 7:20 | 7:35 | 7:50 | 8:05 | 8:20 | 8:35 | 8:50 | 9:05 | 9:20 | |
| 1:00 | 1:15 | 1:30 | 1:45 | 2:00 | 2:15 | 2:30 | 2:45 | 3:00 | 3:15 | 3:30 | 3:45 | 4:00 | 4:15 | 4:30 | 4:45 | 5:00 | 5:15 | 5:30 | 5:45 | 6:00 | 6:15 | 6:30 | 6:45 | 7:00 | 7:15 | 7:30 | 7:45 | 8:00 | 8:15 | 8:30 | | | | | |
| 1:10 | 1:25 | 1:40 | 1:55 | 2:10 | 2:25 | 2:40 | 2:55 | 3:10 | 3:25 | 3:40 | 3:55 | 4:10 | 4:25 | 4:40 | 4:55 | 5:10 | 5:25 | 5:40 | 6:00 | 6:10 | 6:25 | 6:40 | 6:55 | 7:10 | 7:25 | 7:40 | 7:55 | 8:10 | 8:25 | 8:40 | | | | | |
| 1:20 | 1:35 | 1:50 | 2:05 | 2:20 | 2:35 | 2:50 | 3:05 | 3:20 | 3:35 | 3:50 | 4:05 | 4:20 | 4:35 | 4:50 | 5:05 | 5:20 | 5:35 | 5:50 | ABC | construction | | 6:20 | 6:35 | 6:50 | 7:05 | 7:20 | 7:35 | 7:50 | 8:05 | 8:20 | 8:35 | 8:50 | | | |
| 1:30 | 1:45 | 2:00 | 2:15 | 2:30 | 2:45 | 3:00 | 3:15 | 3:30 | 3:45 | 4:00 | 4:15 | 4:30 | 4:45 | 5:00 | 5:15 | 5:30 | 5:45 | 6:00 | ABC | construction | | 6:30 | 6:45 | 7:00 | 7:15 | 7:30 | 7:45 | 8:00 | 8:15 | 8:30 | 8:45 | 9:00 | | | |
| 1:40 | 1:55 | 2:10 | 2:25 | 2:40 | 2:55 | 3:10 | 3:25 | 3:40 | 3:55 | 4:10 | 4:25 | 4:40 | 4:55 | 5:10 | 5:25 | 5:40 | 5:55 | 6:10 | ABC | construction | | 6:40 | 6:55 | 7:10 | 7:25 | 7:40 | 7:55 | 8:10 | 8:25 | 8:40 | 8:55 | 9:10 | | | |
| 1:50 | 2:05 | 2:20 | 2:35 | 2:50 | 3:05 | 3:20 | 3:35 | 3:50 | 4:05 | 4:20 | 4:35 | 4:50 | 5:05 | 5:20 | 5:35 | 5:50 | 6:05 | 6:20 | ABC | construction | | 6:50 | 7:05 | 7:20 | 7:35 | 7:50 | 8:05 | 8:20 | 8:35 | 8:50 | 9:05 | 9:20 | | | |
| 2:00 | 2:15 | 2:30 | 2:45 | 3:00 | 3:15 | 3:30 | 3:45 | 4:00 | 4:15 | 4:30 | 4:45 | 5:00 | 5:15 | 5:30 | 5:45 | 6:00 | 6:15 | 6:30 | ABC | construction | | 7:00 | 7:15 | 7:30 | 7:45 | 8:00 | 8:15 | 8:30 | 8:45 | 9:00 | | | | | |
| 2:10 | 2:25 | 2:40 | 2:55 | 3:10 | 3:25 | 3:40 | 3:55 | 4:10 | 4:25 | 4:40 | 4:55 | 5:10 | 5:25 | 5:40 | 5:55 | 6:10 | 6:25 | 6:40 | 6:50 | 7:00 | 7:10 | 7:20 | | | | | | | | | | | | | |
| 2:20 | 2:35 | 2:50 | 3:05 | 3:20 | 3:35 | 3:50 | 4:05 | 4:20 | 4:35 | 4:50 | 5:05 | 5:20 | 5:35 | 5:50 | 6:05 | 6:20 | 6:35 | 6:50 | 7:00 | 7:10 | 7:20 | 7:30 | | | | | | | | | | | | | |
| 2:30 | 2:45 | 3:00 | 3:15 | 3:30 | 3:45 | 4:00 | 4:15 | 4:30 | 4:45 | 5:00 | 5:15 | 5:30 | 5:45 | 6:00 | 6:15 | 6:30 | 6:45 | 7:00 | 7:10 | 7:20 | 7:30 | 7:40 | | | | | | | | | | | | | |
| 2:40 | 2:55 | 3:10 | 3:25 | 3:40 | 3:55 | 4:10 | 4:25 | 4:40 | 4:55 | 5:10 | 5:25 | 5:40 | 5:55 | 6:10 | 6:25 | 6:40 | 6:55 | 7:10 | 7:20 | 7:30 | 7:40 | 7:50 | | | | | | | | | | | | | |
| 2:50 | 3:05 | 3:20 | 3:35 | 3:50 | 4:05 | 4:20 | 4:35 | 4:50 | 5:05 | 5:20 | 5:35 | 5:50 | 6:05 | 6:20 | 6:35 | 6:50 | 7:05 | 7:20 | 7:30 | 7:40 | 7:50 | | | | | | | | | | | | | | |

YOUR GOLF COURSE

123 HOGAN LANE    SOMEWHERE, USA    999-456-7899

| | | | | | |
|---|---|---|---|---|---|
| JOHN | SMITH | T1 | 7:10 | | 2/19/09 |
| | | | TOTAL | | $99.90 |
| 1 | SAT | 7 TIL 3 | 18 | | $75.00 |
| | SENIOR | | | | -$10.00 |
| | CREDIT | | | | -$5.00 |
| 1 | CLUB RENTALS | | | | $15.00 |

| | | | |
|---|---|---|---|
| | MERCHANDISE | TOTAL | $24.90 |
| | | SALES TAX | $0.90 |
| 0 | RANGE BALLS- SM | $6.00 | $0.00 | $0.00 |
| 1 | RANGE BALLS- LG | $9.00 | $0.00 | $9.00 |
| 1 | AHEAD SHIRT | $0.00 | -30% | $0.00 |
| 1 | TITLEIST NXT - DZ | $15.00 | 0% | $15.00 |

TRANSACTION #      10001

FIGURE 9

JOHN SMITH

GOLFER HISTORY

| DATE | DAY | # HOLES | STATUS | CREDITS DUE | GREEN FEE | MERCHANDISE $ | RENTALS | RANGE | TOTAL | |
|------|-----|---------|--------|-------------|-----------|---------------|---------|-------|-------|---|
|      |     |         |        | $140.00     | $320.00   | $186.40       | $15.00  | $15.00| $536.40 | revenue booked |
|      |     |         |        |             |           |               |         |       | $75.00 | minus credits redeemed |
|      |     |         |        |             |           |               |         |       | $461.40 | revenue received |
| 3/1/08 | mon | | public | $15.00 | | | | | $0.00 | |
| 03/05/08 | wed | 18 | public | -$15.00 | $40.00 | $23.00 | | $6.00 | $54.00 | raincheck |
| 04/01/08 | thur | 18 | e. guest | | $20.00 | $13.50 | | | $33.50 | |
| 04/12/08 | fri | 18 | public | | $40.00 | $134.00 | | | $174.00 | |
| 04/14/08 | mon | | | $200.00 | | | | | $0.00 | barter |
| 04/30/08 | sat | 18 | public | -$55.00 | $55.00 | | | | $0.00 | |
| 05/01/08 | sun | | | $100.00 | | | | | $100.00 | prepaid |
| 05/02/08 | thur | 9 | public | -$25.00 | $25.00 | | | | $0.00 | |
| 05/08/08 | thur | 9 | public | -$25.00 | $25.00 | | | | $0.00 | |
| 5/15/08 | fri | 9 | public | -$25.00 | $25.00 | | | | $0.00 | |
| 5/22/08 | thur | 9 | public | -$5.00 | $25.00 | | | | $0.00 | |
| 02/19/09 | thur | 18 | senior | | $65.00 | $15.90 | $15.00 | $9.00 | $99.90 | raincheck |

FIGURE 10 scanned product code gives item/price to transaction entering quantity will generate labels (barcode) for merchandise → transferred to accounting → year end physical numbers

| dept | item | description | product code | sell price | qty on hand | avg cost | inventory $ : margin gain(+) or loss(-) | | qty sold ytd | cost of sales | start inventory | | from invoices during year (entered with password) | | | | | |
|---|---|---|---|---|---|---|---|---|---|---|---|---|---|---|---|---|---|---|
| | | | | | | | $1,299.20 | | | $1,823.80 | | | | | | | | |
| | | | | | | | -$73.25 | | | | | | | | | | | |
| shirts | A-HEAD | | 1234567898987654 | $52.00 | 10 | $36.63 | $366.25 | 42% | 30 | $1,098.75 | 6 | $190.00 | 13 | $475.00 | 21 | $800.00 | 40 | 15 |
| | | | | | 8 | | -$73.25 | | | | | | | | | | $225.00 | $90.00 |
| | NIKE | | 2345678987876543 | $45.00 | 12 | $36.84 | $442.11 | 22% | 7 | $257.89 | 6 | $200.00 | 10 | $350.00 | 3 | $150.00 | | |
| balls (sleeve) | titleist NXT | | 3456789876865432 | $8.00 | 46 | $5.83 | $268.25 | 37% | 43 | $250.75 | 6 | $36.00 | 18 | $108.00 | 6 | $60.00 | 10 | |
| | | | | | 46 | | $0.00 | | | | | | | | | | | |
| | titleist proV1 | | 4567898987654321 | $12.00 | 31 | $9.54 | $295.85 | 26% | 15 | $143.15 | 6 | $54.00 | 10 | $100.00 | 30 | $285.00 | | |
| | | | | | 31 | | $0.00 | | | | | | | | | | | |
| hats | | | | | | | | | | | | | | | | | | |
| shorts | | | | | | | | | | | | | | | | | | |

60 actual quantity on hand as a result of physical inventory entered by manager with password this would come from transactions (starts over each year)

GOLF COURSE TIME MANAGEMENT SYSTEM

CROSS REFERENCE TO RELATED APPLICATION

The present invention claims the benefit of U.S. provisional application Ser. No. 61/029,804, filed Feb. 19, 2008, which is hereby incorporated herein by reference in its entirety.

FIELD OF THE INVENTION

The present invention relates generally to a computer software program, and more particularly, to a computer software program for scheduling of a golf course.

BACKGROUND OF THE INVENTION

Golf courses typically use a paper "tee sheet" for manually scheduling and tracking the utilization of the course. In some cases, a computer system is used to enter reservations in a schedule that resembles a paper tee sheet. Other systems permit real-time tracking of the positions of players along a course.

SUMMARY OF THE INVENTION

The present invention provides a system for managing tee times at a golf course in order to maximize usage of the course while preventing schedule conflicts between players on the course. The present invention provides a computer and a display or monitor for displaying a grid that is organized according to hole number and time. The present invention further provides designators on the display, such as shading, to represent the course schedule for a given day or portion of a day so that an operator can visually determine what tee times, game durations, and/or starting holes are available for scheduling.

According to one aspect of the invention, a computer-implemented golf course reservation system includes a computer, a computer database, a user interface, a display, and a computer program accessible by the computer. The computer database is accessible by the computer and stores golf course reservation data. The computer defines input fields at the display, the input fields for receiving a user input selection of golf reservation parameters for a customer. The user input selection is entered via the user interface. The display visually displays designators generated by the computer, and includes a grid arranged according to golf hole designators and time designators corresponding to the golf hole designators. The computer program calculates golf course occupancy based on the golf reservation parameters input into the input fields, and the display displays an occupancy parameter of the golf course as a function of the golf reservation parameters. The occupancy parameter includes a visual designator at each portion of the grid, each visual designator corresponding to a time at which a portion of the golf course (identified by hole number) will be occupied. The reservation designator thus provides a visual display indicative of a predicted location of the players corresponding to the identifier.

Optionally, the reservation designator, which may take the form of shading, lines, colors, altered fonts, or the like, is displayed in a position in the grid corresponding to a start time and a start hole, and includes an identifier for identifying one or more players associated with the reservation designator.

Optionally, the reservation system may further include a sales system for computing and compiling sales transactions. The sales transactions may include, for example, green fees, annual fees, rentals such as golf club rental, range fees, equipment sales, clothing sales, and general golf merchandise sales. At least one of the reservation system's input fields may receive a user input selection of merchandise parameters for a customer. Optionally, the golf reservation parameters include identification data, start-time data, game-duration data, and start-hole data. The reservation system may include a second display that visually displays additional portions of the grid and the designators generated by the computer.

Therefore, the present invention provides a tee time scheduler and time management system that provides an intuitive visual display of golf course utilization throughout an entire day, which facilitates booking of more tee times for increased golf course utilization and revenue. In addition, "shotgun" starts and other booking or scheduling variations are easily accomplished and visually displayed.

These and other objects, advantages, purposes, and features of the present invention will become apparent upon review of the following specification in conjunction with the drawings.

BRIEF DESCRIPTION OF THE DRAWINGS

FIG. 2B is a second portion of the gridded schedule of FIG. 2A;

FIG. 3B is a second portion of the gridded schedule of FIG. 3A;

FIG. 4 is a display and data entry window for reservations and check-in;

FIG. 8 is a sales transaction summary;

FIG. 9 is a golfer history chart;

FIG. 10 is an inventory chart;

FIG. 13A is a first portion of another alternative embodiment gridded schedule in accordance with the present invention, for displaying more than eighteen holes of play;

FIG. 13B is a second portion of the gridded schedule of FIG. 13A;

FIG. 14 is another alternative embodiment gridded schedule in accordance with the present invention, having hole numbers arranged in columns and tee times listed in rows;

DESCRIPTION OF THE PREFERRED EMBODIMENTS

Figure 1:
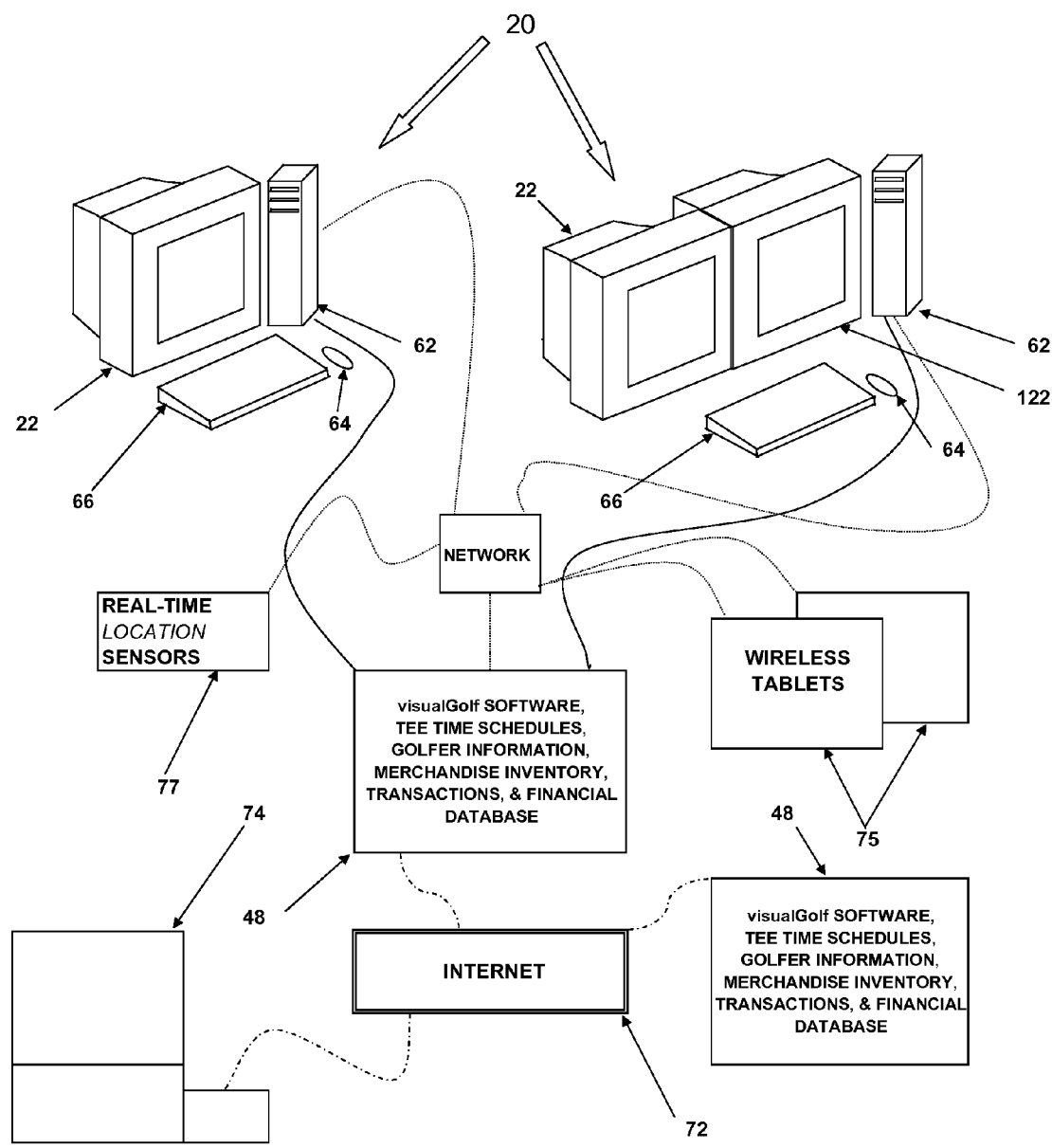
FIG. 1 is an illustration of a computer, network, and database system that may be used in conjunction with the present invention.

A golf course typically schedules players by assigning each group of players (typically between one and four players) a "tee time" at which they will begin their game. Typically, tee times are scheduled for the first or tenth hole of an eighteen-hole course. Each tee time assigned to a group is often spaced from other tee times by at least seven to ten minute intervals, so that groups are scheduled to tee off (i.e. to start their games) at specific time intervals. Each game is expected to end a certain time after it starts, and this "average game time" is typically estimated according to the golf course operator's experience. A "tee sheet" is a document commonly used to record the course's schedule of tee times on a given day, and it is typically arranged with tee times in a vertical column and spaces to the right of each tee time for an operator to enter the name of a group or individual who has reserved that time.

Computers have been used to record tee times and display tee sheets electronically, with the added benefit of the ability to collect and store information about players, such as name, address, phone number, frequency of play, etc. However, computer-implemented tee sheets generally have not advanced significantly in that they are limited to displaying a column of tee times with corresponding rows of space for entering reservation names. Some computer-implemented tee sheets include "split screens" with one screen or view for the "front nine" and another screen or view for the "back nine", where reservations entered on one screen are carried over to the other. Oftentimes, in order to track players who wish to play only nine holes instead of eighteen, an operator typically must use a "remarks" or "comments" field to notify himself or other users of the tee sheet of that fact so that another group playing nine holes could be scheduled to start where the first group leaves off. Careful attention to such comments is required so that the golf course can be utilized at an efficient level.

In addition, other common types of scheduling include "outings", in which a large group of golfers desire to have similar tee times so that they can start and finish their games at approximately the same time. This is accomplished by starting groups on different holes at the same time, in what is commonly called a "shotgun" start. Because typical paper and electronic tee sheets are not set up to accommodate golf games starting anywhere but on the first hole (and perhaps the tenth hole), organizing a shotgun start, using known tee sheets, in such a way as to ensure that the outing groups do not interfere with each other, or with other golfers, can be very difficult, especially at high-demand times. Often, such outings are spaced far from other groups to avoid conflict, such that much of the course remains unused while the outing is playing. Further, typical tee sheets give no indication of where a group should be located on the course, except for the tee time, such that it is difficult to locate a group or ascertain whether the group is slower or faster than average. Thus, typical paper and electronic tee sheets make it difficult to optimize usage of a course, are heavily reliant on operators to be diligent and use consistent methods to track course usage, and are susceptible to inefficiency and error.

Referring now to the drawings and the illustrative embodiments depicted therein, a golf course time management system 20 permits scheduling and tracking of utilization of a golf course as shown in FIG. 1, in which various categories of data connections (e.g. network, database, and Internet connections) share common line types. In addition, system 20 provides a readily-discernable visual indication of scheduled golf course utilization so that an operator may quickly and accurately visually determine available tee times and start holes (i.e. golf reservation parameters) and thus prevent scheduling conflicts. Optionally, system 20 also provides for registering and tracking merchandise sales and golfer records.

System 20 includes a monitor or display 22 at a computer or terminal 62 for displaying data pertaining to reservations for golf games and merchandise purchases. Optionally, a user interface such as a computer mouse 64 and/or a keyboard 66 may be provided at terminal 62 to facilitate data entry. Computer or terminal 62 contains or is linked to a database 48 that stores data such as golf schedules, golfer information, merchandise information, and the like. Computer or terminal 62 may also receive data from sensors 77 that detect the position of golfers on the course, and may indicate the golfers' location on display 22. System 20 may be implemented over the Internet 72, and may be accessed with personal computers 74, as will be described in greater detail below. Optionally, the system is implemented locally with the database maintained on-site, and with or without access to the system via the Internet 72 and personal or remote computers 74.

Figure 2A:
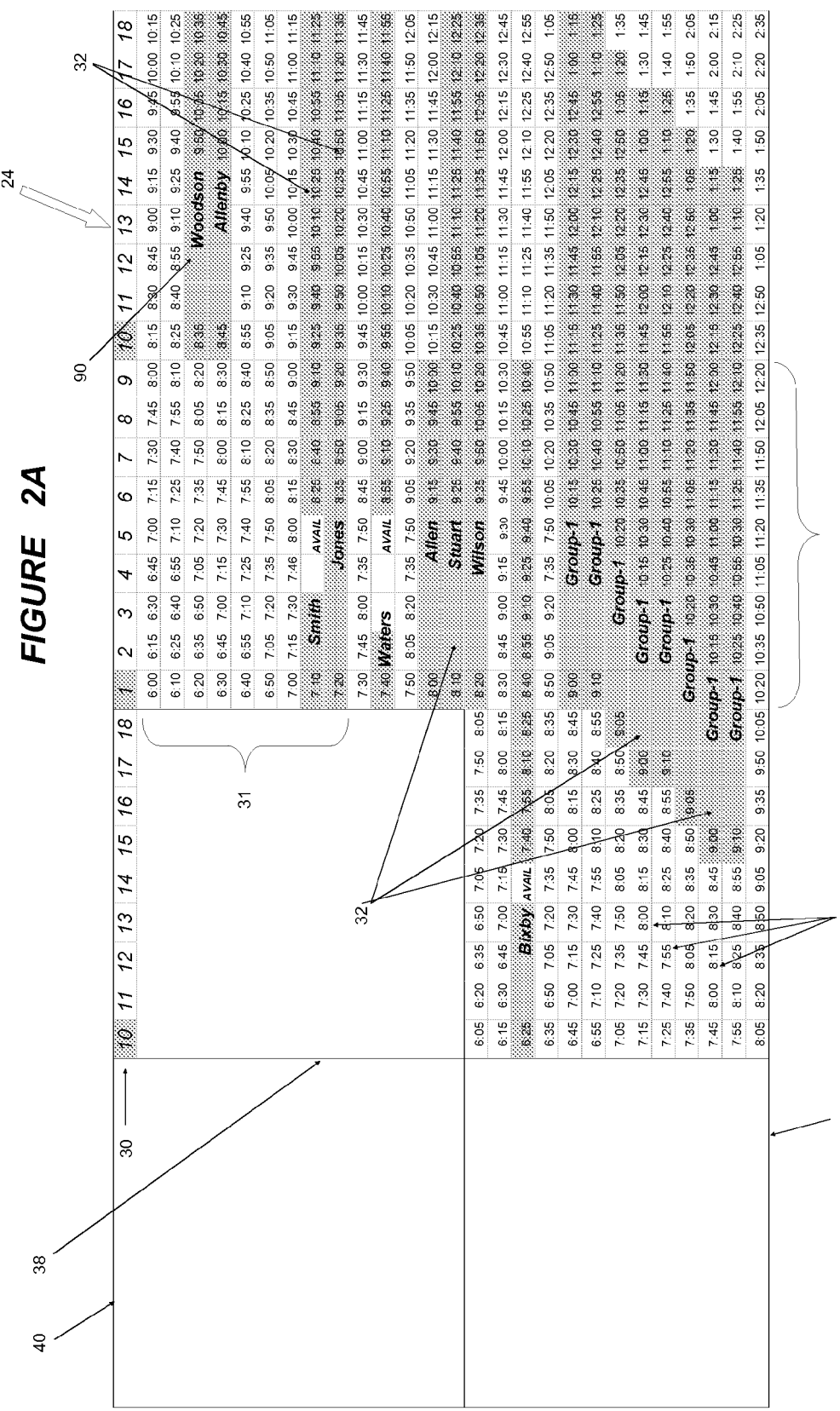
FIG. 2A is a first portion of a gridded schedule in accordance with the present invention.

Display 22 includes a rectangular array, tee time scheduler, or grid 24 of individual cells 26 arranged according to time and golf hole number (FIGS. 2A and 2B). Golf hole numbers or golf hole designators are displayed along a top row 30 of cells 26 and tee times or time designators are displayed in columns 28 under each hole number. Rows 31 located below top row 30 contain times at which golfers are expected to tee off at a given hole listed in top row 30. Tee times in columns 28 progress in intervals based on time allotted between groups on a given hole, whereas tee times in rows 31 progress in intervals based on expected time to play a given hole. By providing visual designators such as shading 32 (FIGS. 2A-3B) in cells 26 of grid 24, system 20 provides a visual display of an occupancy parameter (i.e. the estimated occupancy) of the entire golf course for a given day. It will be appreciated that lines, colors, fonts or other designators can be used in place of shading 32 to indicate occupancy or occupancy parameter of the course. Optionally, a second display 122 (FIG. 1) may be provided at terminal 62 in order to show a greater portion (or additional portions) of grid 24, which may permit the operator to view an entire day's schedule.

Time management system 20 may be implemented at computer or terminal 62, which is in communication with database 48. Computer mouse 64 and keyboard 66 may be provided at terminal 62 to facilitate data entry and data manipulation by the operator at terminal 62. Optionally, multiple terminals 62 may be operated in communication with database 48 so that multiple operators can view, enter, and modify reservation data from remote locations. In addition, wireless tablet computers 75 may be used to remotely access and/or modify reservations in system 20.

As best seen in FIGS. 2A-3B, display 22 displays portions of grid 24, in which tee times within cells 26 are arranged horizontally according to sequentially-listed golf hole numbers (in top row 30) with later times listed for each subsequent hole in accordance with a fifteen-minute expected time duration between holes. In the illustrated embodiment, specifically listed hole numbers in row 30 repeat a "1 through 18" sequence several times to allow tee times to be displayed for the duration of the entire day. This horizontal repeating of the hole number sequence also allows shading to be continuous from hole number 10 through hole number 9, for example. In the illustrated embodiment, tee times are arranged in vertical columns 28 in ten minute increments, each hole number being assigned a time that is ten minutes later than the previous time to indicate ten minute intervals between tee times. For example, and with reference to FIG. 2A, the first tee time of the day for hole one may be 6:00 a.m., the second tee time of the day for hole one may be at 6:10 a.m., the third tee time at 6:20 a.m., etc. The times arranged in columns 28 thus increase by the tee time interval of ten minutes. Optionally, the times arranged along columns 28 and rows 31 may be selected according to any other desired time intervals. Optionally, each hole may be assigned an individual or custom time based on the average duration that a group is expected to spend on that particular hole.

With reference to FIGS. 2A and 2B, the time at which an eighteen-hole game (that tees off at hole one) is expected to conclude corresponds to the first tee time for the next sequence of hole numbers of grid 24 (as in FIG. 2B). For example, the first tee-time listed for hole one is 6:00 a.m. (FIG. 2A) and an eighteen-hole game would be expected to end 4½ hours later at 10:30 a.m. (FIG. 2B). Likewise, grid 24 shows the 7:20 a.m. group (Jones, FIG. 2A) teeing off from the eighteenth hole at 11:35 a.m. and presumably concluding the eighteenth hole at about 11:50 a.m.

Regardless of the expected duration of a game beginning on hole one, the column corresponding to the tee times for hole one ends with a tee time that is earlier than the first tee time of the next column of tee times that correspond to hole one so that a given tee time is never repeated for a given hole. Thus, with reference to hole one tee times of grid 24 (FIG. 2A), the column 28 corresponding to hole one ends with a 10:20 a.m. tee time, which is four hours and twenty minutes after the 6:00 a.m. tee time on hole one. This arrangement permits the next hole number sequence of grid 24 (FIG. 2B) to continue the natural progression of tee times for holes one through eighteen along rows 31 that began in hole one number sequence of grid 24 of FIG. 2A. Thus, it will be understood that hole one tee times of grid 24, as in FIG. 2A, are followed by another set of hole one tee times of grid 24, as in FIG. 2B, such that the expected occupancy of an entire eighteen-hole golf course is displayed at once for a block of time corresponding to the expected length of play of the eighteen holes of the course, for the entire day and without duplication of tee times for any hole.

Optionally, and as shown in FIG. 2A, holes ten through eighteen may be scheduled for a period of time substantially corresponding to the initial tee times for hole one. For example, rather than permit holes ten through eighteen to lie unused while early morning golfers tee off from hole one between the hours of 6:00 a.m. and 8:10 a.m. (unused because the first group of golfers teeing off at 6:00 a.m. will not reach the tenth hole until about 8:15 a.m.), additional groups of golfers may be scheduled to tee off from the tenth hole starting at 6:05 a.m. and in ten minute increments thereafter. This scheduling arrangement permits increased usage of the course and may be referred to as "crossover tee times," in which groups that start on the front nine (i.e., holes one through nine) cross over to the back nine (i.e., holes ten through eighteen) while groups that start on the back nine cross over to the front nine. Thus, grid 24 permits an operator to observe a potential conflict between, for example, a group that wants to play an eighteen-hole game and tee off from the tenth hole at 6:05 a.m., and the "Wilson" group (FIG. 2A) that is already scheduled to tee off from hole one at 8:20 a.m., while the "Bixby" group may be scheduled for an eighteen-hole game starting on the tenth hole at 6:25 am without conflict.

Each hole that is subsequent to the tee-off hole is listed with a predicted time at which a given golfer or group of golfers is expected to tee off at that hole. For example, if the average time required for a group to play eighteen holes of golf at a course is four hours and thirty minutes, fifteen minutes may be allocated for each hole so that a group teeing off at hole one at 6:00 a.m. will be expected to tee off from the second hole at 6:15 a.m., from the third hole at 6:30 a.m., etc., until the group is expected to tee off from the eighteenth and final hole at approximately 10:15 a.m., after which their eighteen-hole game is completed.

Occupancy of the golf course is displayed on grid 24 of display 22 by automatic placement of shading 32 in a cell 26 of grid 24 (FIGS. 2A-3B). Shading 32 may be used in each cell 26 of grid 24 to provide a visual indication of the times at which a given hole of the golf course will be occupied on a given day. It will be understood that any visual designator, such as, for example, lines, bold font, italic font, underlined font, colored font or colored or highlighted cells, or the like, may be used without departing from the spirit and scope of the present invention.

For example, and with reference to FIG. 2A, a group identified by the name "Smith" will tee off from hole one at 7:10 a.m., is expected to tee off from the tenth hole at 9:25 a.m., and is expected to tee off from the eighteenth and final hole at 11:25 a.m. Similarly, a group under the name "Jones" will be teeing off from hole one at 7:20 a.m., ten minutes after the "Smith" group, and is expected to follow approximately ten minutes behind the "Smith" group throughout the game, thus teeing off from the tenth hole at 9:35 a.m. and teeing off from the eighteenth and final hole at 11:35 a.m. Because a given group is expected to occupy a given hole for about fifteen minutes on average, and groups can tee off about ten minutes apart, two groups may be expected to occupy different portions of the same hole for about five minutes (e.g., a leading group may be putting on hole one while a trailing group is teeing off on hole one).

Thus, according to the above example, each of holes one through eighteen will be occupied by one or both of the "Smith" group and the "Jones" group for approximately twenty-five minutes during the day. For example, the "Smith" group will tee off from the sixth hole at 8:25 a.m. and the "Jones" group will tee off from the sixth hole at 8:35 a.m. and will depart that hole by 8:50 a.m. as indicated by the "Jones" group's arrival at the seventh hole at 8:50 a.m. Thus, the sixth hole will be occupied by "Smith" and/or "Jones" from about 8:25 a.m. to about 8:50 a.m.

Additionally, groups will be teeing off from hole one at 7:40 a.m. (the "Waters" group), at 8:00 a.m. (the "Allen" group), at 8:10 a.m. (the "Stuart" group), and at 8:20 a.m. (the "Wilson" group). Because the 8:00 a.m. "Allen" group is only scheduled to play nine holes (as indicated by shading in FIG. 2A), the tenth hole is not shaded at 10:15 a,m., thereby providing a clear visual indication to the operator that another group may tee off from the tenth hole at 10:15 a.m. and play either nine or eighteen holes. Similarly, 7:30 a.m. and 7:50 a.m. tee times are available at hole one, as indicated by the lack of shading 32 or other designator.

Designators such as shading 32 may also be used to clearly illustrate and display less-conventional scheduling, such as "shotgun starts" for large groups in which all of the members of the group wish to begin and end their games at approximately the same times. For example, and with reference to FIG. 2A, a large group identified by the name "GROUP-1" is divided into eight groups of golfers, each of which tees off from a specific hole (hole number one, fifteen, sixteen, seventeen, or eighteen) at a time between 9:00 am. and 9:10 a.m. As indicated by shading 32, each subgroup labeled "GROUP-1" will tee off from their respective last hole (hole number eighteen, seventeen, sixteen, fifteen, or fourteen) at a time between 1:15 p.m. and 1:25 p.m. Thus, large groups may be accommodated and their staggered use of the course visually indicated to an operator or user of display 22 so that the operator may quickly and easily observe the predicted occupancy of the course by the large group, and also may see that it would be inappropriate, for example, to schedule a group playing nine or more holes that tees off from the tenth hole between 7:05 a.m. and 7:55 a.m. A group teeing off from the tenth hole at 7:05 a.m. (FIGS. 2A and 3A) would be predicted to conflict with the "GROUP-1" subgroup teeing off from the eighteenth hole at 9:05 a.m. Predicted conflicts are thus displayed visually to an operator, and may also be indicated in a warning message or pop-up on display 22, as will be described in greater detail below.

Any group scheduled for a game that begins on a portion of grid 24 (FIG. 2A) that would continue onto another portion of grid 24 (FIG. 2B) is visually carried over to the latter portion by system 20, such as with shading 32. For example, in the illustrated embodiment the "Woodson" and "Allenby" groups have tenth-hole tee times of 8:35 a.m. and 8:45 a.m., respectively, and are scheduled to play eighteen-hole games that end on the ninth hole at 12:50 p.m. and 1:00 p.m., respectively. The tenth through eighteenth holes are thus shaded on grid 24 (FIG. 2A) and the shading is carried over or continued by system 20 onto grid 24 (FIG. 2B), in which holes one through nine are shaded appropriately.

Optionally, the available tee times may be automatically adjusted according to the known sunrise and sunset times on the date for which grid 24 is shown, thereby preventing the operator from scheduling times that begin or end in darkness. Such adjustments may be made, for example, by shading times that are known to occur in darkness, or by displaying only the times that are known to occur in sufficient daylight for playing golf. Thus, for example, a golfer making a reservation in the summer for a golf game to occur in the fall will be prevented from accidentally scheduling a tee time that would be inappropriate in the shorter daylight of fall.

Optionally, groups may be identified according to one member of the group, wherein that member's name 90 is placed in a cell 26 to the right of the group's tee time according to the number of people in the group. For example, and with reference to FIG. 2A, the name "Smith" appears two cells to the right of the "Smith" group tee time of 7:10 a.m., thus indicating to operators that the "Smith" group has only two players and might be able to accept up to two additional players. Similarly, the "Jones" group, for which the name "Jones" appears in the fourth cell to the right of the 7:20 a.m. hole one tee time, has four members or players in the group, as do the "Allen", "Stuart", and "Wilson" groups. The "Waters" group tees off at 7:40 a.m. and consists of only one member or player, as indicated by the name "Waters" appearing in the first cell to the right of the 7:40 a.m. tee time. For the "Smith" and "Waters" groups, cells are left unshaded according to the number of additional players that could be added to the respective group (assuming a maximum of four players per group) and "AVAIL" is shown in one of the non-shaded cells, although other indicia could be used.

Display 22 may include a reservation and check-in window 36, a calendar window 38, and a golfer list window 40. Reservation and check-in window 36 (FIGS. 2A, 3A, and 4) permits the operator to view, enter, and revise reservations for golf games by date, time, name, number of holes of play (typically nine or eighteen), and to calculate fees such as green fees 92, club and cart rental 43, range balls 45, clothing or merchandise 94, and the like using system 20, as will be described in greater detail below. Optionally, each name 90 appearing in the reservation and check-in window 36 may be color-coded or otherwise distinguishable based upon the golfer's relationship with the club (e.g. member, public, guest, senior, employee, etc.).

Figure 6:
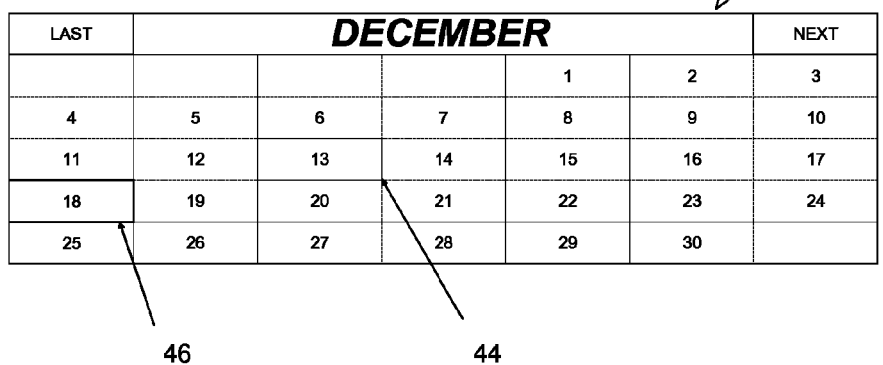
FIG. 6 is a calendar display window.

Calendar window 38 (FIGS. 2A, 3A, and 6) permits the operator to select a particular date for scheduling purposes. For example, and with reference to FIG. 6, a single box 44 may be used to indicate the present date and a double box 46 may be used to indicate the date displayed at reservation and check-in window 36.

Figure 7:
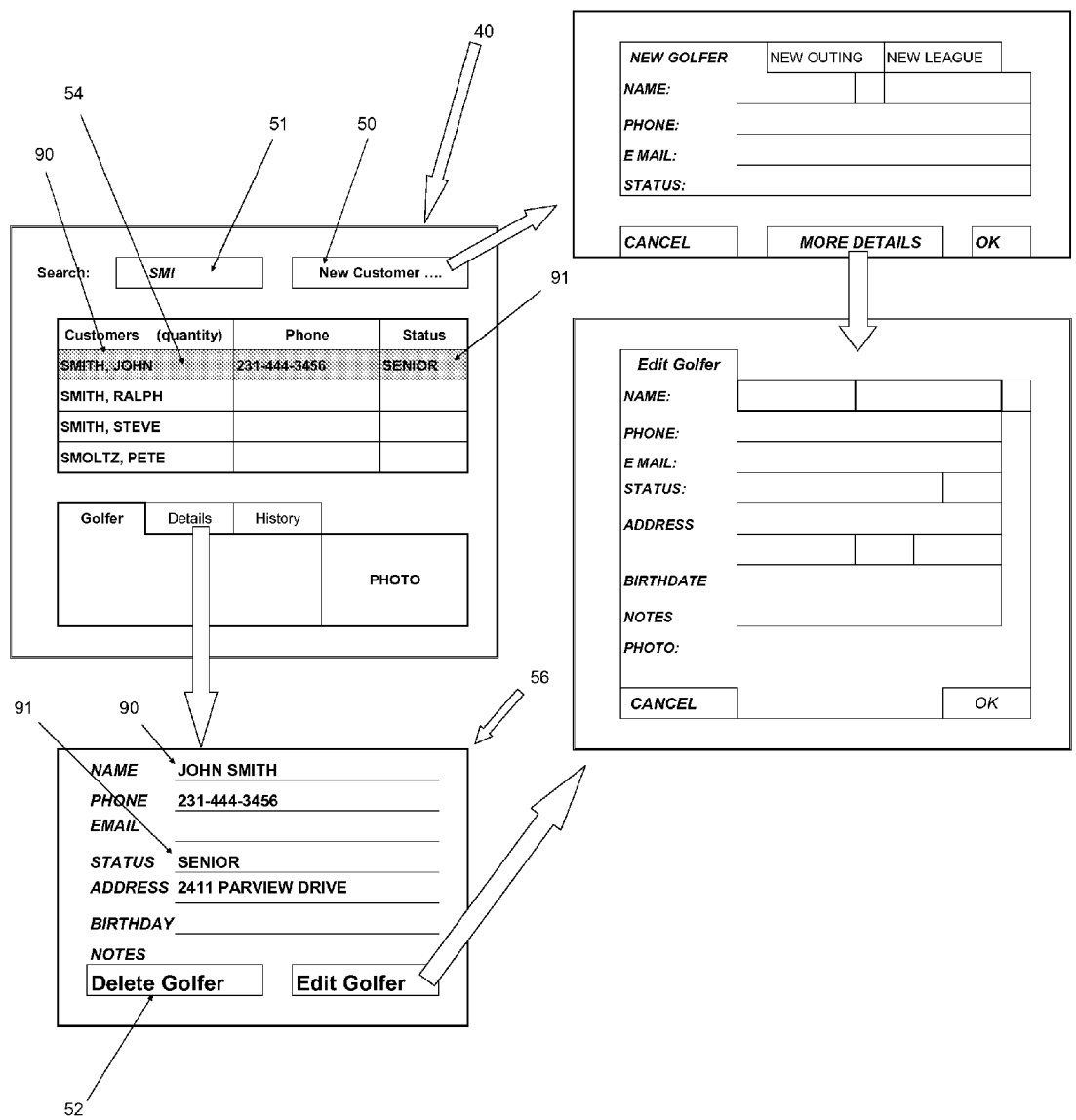
FIG. 7 is a flow chart of data entry windows in a procedure for selecting and entering golfer data.

Golfer list window 40 (FIGS. 2A, 3A, and 7) permits the operator to search, select, enter, and remove golfers in database 48, such as for entry into reservation and check-in window 36. For example, a "NEW CUSTOMER" icon 50 (FIG. 7) permits the operator to enter, via input fields, the name of a golfer and other identifying information such as phone number, the golfer's photograph for identification and/or confirmation purposes, and highlight markings 54 indicate which golfer's information is selected for editing or scheduling. Optionally, an individual golfer information window 56 (FIG. 7) may include data such as full name 90, address, phone number, e-mail address, birth date, member status 91, and a "DELETE" icon 52 permits the operator to remove a golfer from the database 48. Optionally, an individual golfer history chart 89 (FIG. 9) may include transaction history data that is logged from entries made at reservation and check-in window 36. Transaction history data may include, for example, the date(s) on which purchases were made, the status of each transaction, green fees 92, issued credits 93, redeemed credits 95, merchandise charges 94, rental charges 43, range fees 45, total fees charged 87, and a remarks section 47 indicating, for example, when credits or rain checks are given for inclement weather or barter agreements with players.

Figure 5:
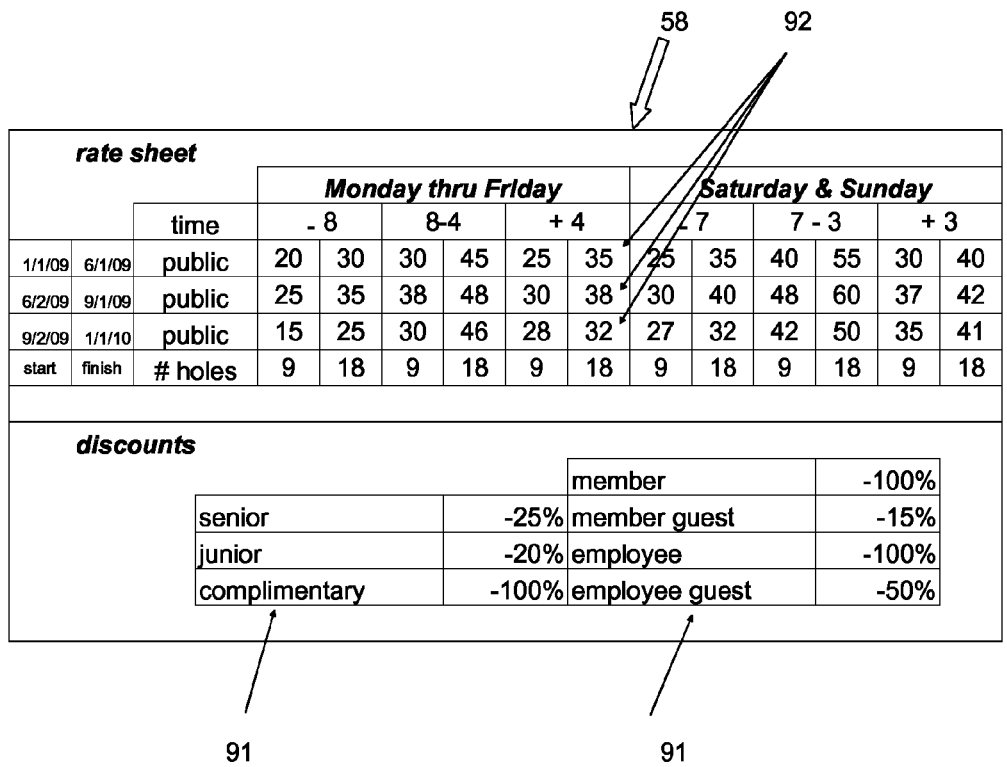
FIG. 5 is a display chart for fees.

Transaction summary 42 (FIG. 8) displays a receipt for a given transaction and may include, for example, total amount due 87, regular charges, and discounts that are applicable for the particular golfer. Regular charges and discounts may be dependent upon the day of the week, the golfer's age, the golfer's relationship with the golf course, or other factors. For example, a rate sheet 58 (FIG. 5) may be stored at database 48 and made accessible through system 20 and displayed at display 22 for tabulating standard green fees 92 that are charged at certain days of the week and times of day, along with discounts applicable for certain golfers. Optionally, the contents of transaction summary 42 may be printed on a paper receipt for the golfer.

Optionally, and with reference to FIG. 10, a merchandise inventory chart 60 may be stored in database 48 and used to track and display a listing of merchandise inventory according to parameters such as item name, product code, retail price, quantity in stock, wholesale cost, profit margin, quantity sold to-date, value of sales, and other merchandise and/or sales data. Optionally, merchandise received into inventory and entered into merchandise inventory chart 60 will cause bar-coded labels (not shown) to be printed for attachment to merchandise. The labels are later scanned upon sale and the resulting data used for recording sales transactions. Merchandise inventory chart 60 may also compile "cost of sales" for use in determining eventual financial results.

Accordingly, system 20 provides a visual display of scheduled golf course utilization for a given day in a manner that reduces or prevents the likelihood that an operator of system 20 will attempt to add a new reservation that conflicts with an existing reservation. By automatically placing a designator such as shading 32 in cells 26 corresponding to a group's expected location on the golf course at any given time during the group's reservation, system 20 provides a readily-discernable visual indication of available tee times that will not conflict with existing reservations, thus permitting the operator to offer golfers the full range of available game options or golf reservation parameters (e.g. start holes, tee times, and game lengths) in order to maximize usage of the course without conflicts. Intervals between tee times and average time-per-hole may be adjusted or customized according to a particular golf course in order to accurately predict or estimate the average progress of play throughout the golf course.

In the context of "shotgun" starts and other scheduling variations, system 20 facilitates reservations and displaying a schedule, especially when arranged in a generally horizontal grid, by showing starting times at any and all holes of a course throughout an entire day (FIGS. 2A-3B). Further, by providing an extra-wide display (or two or more displays arranged horizontally), an entire day's schedule can be readily displayed at once, without need for scrolling to hidden portions of the schedule. The enhanced display thus facilitates increased efficiency of golf course usage (and thus increase revenue) by permitting an operator to offer additional scheduling options, such as starting on a hole other than holes one and ten, and scheduling around groups with "shotgun" starts, without risk of scheduling conflicts.

Figure 11:
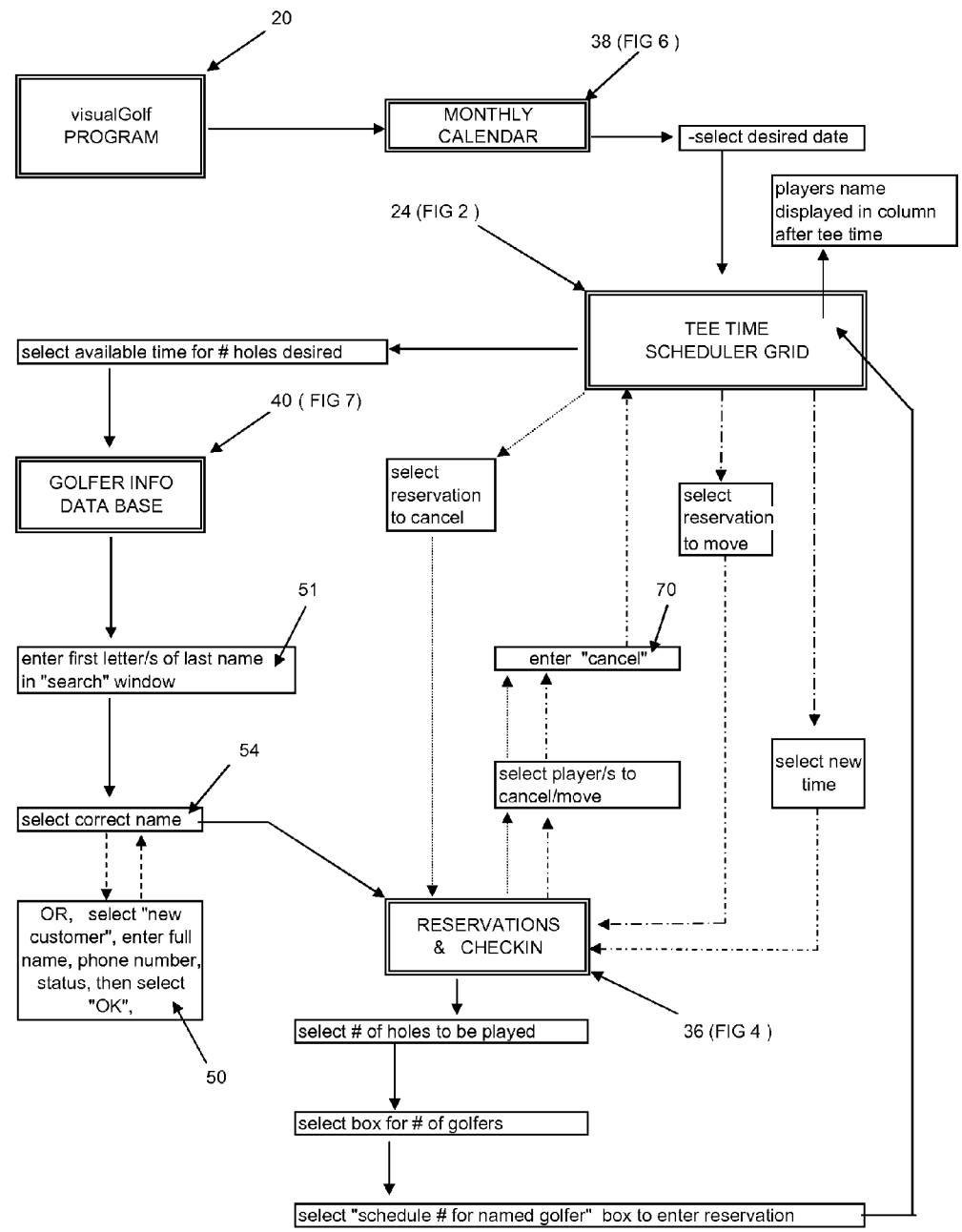
FIG. 11 is a flow chart illustrating a reservation data entry method in accordance with the present invention.

Reservations may be entered, stored, and viewed on display 22 by following a reservation procedure in accordance with the flow chart of FIG. 11 and with reference to FIGS. 2A-3B, 4, 6, and 7. The operator selects the desired reservation date from calendar window 38 (FIG. 6), which causes grid 24 to display all of the existing reservations on that date. After referring to grid 24 (or a relevant portion of grid 24) and conferring with the golfer making the reservation, the operator enters or selects the desired tee time and the start hole number from the grid. The operator then enters a reservation identifier, such as the golfer's name 90 (or a group outing name), into the golfer list window 40 (FIG. 7), as described above and, optionally, any additional name or names by which the reservation is to be identified. Optionally, the operator may enter new golfer information to database 48.

Optionally, golfer list window 40 may anticipate the name of the golfer used to identify the reservation, such as by the first letters of the golfer's last name, so that the operator may select the golfer's name 90 from the database 48 via golfer list window 40, which automatically opens or appears when the golfer's name 90 is anticipated by system 20. Once the golfer's name 90 is highlighted with highlight markings 54, the operator selects an appropriate cell or region 65 (FIG. 4) of reservation and check-in window 36 according to the number of players in the group. The player's status 91 may appear in the reservation and check-in window 36, and also in golfer list window 40, and is used to determine green fees 92 from rate sheet 58. Other factors that may affect green fees 92 include time of year, day of week, time of day, holidays, etc., as described above with reference to FIG. 5. Optionally, system 20 defaults to an eighteen-hole game for each reservation made and populates cells 26 with shading 32 for seventeen additional holes to the right of a selected start hole. System 20 permits the operator to select an alternative number of holes for a particular game, such as nine holes or twenty-seven holes, or more or less, as desired.

Figure 3A:
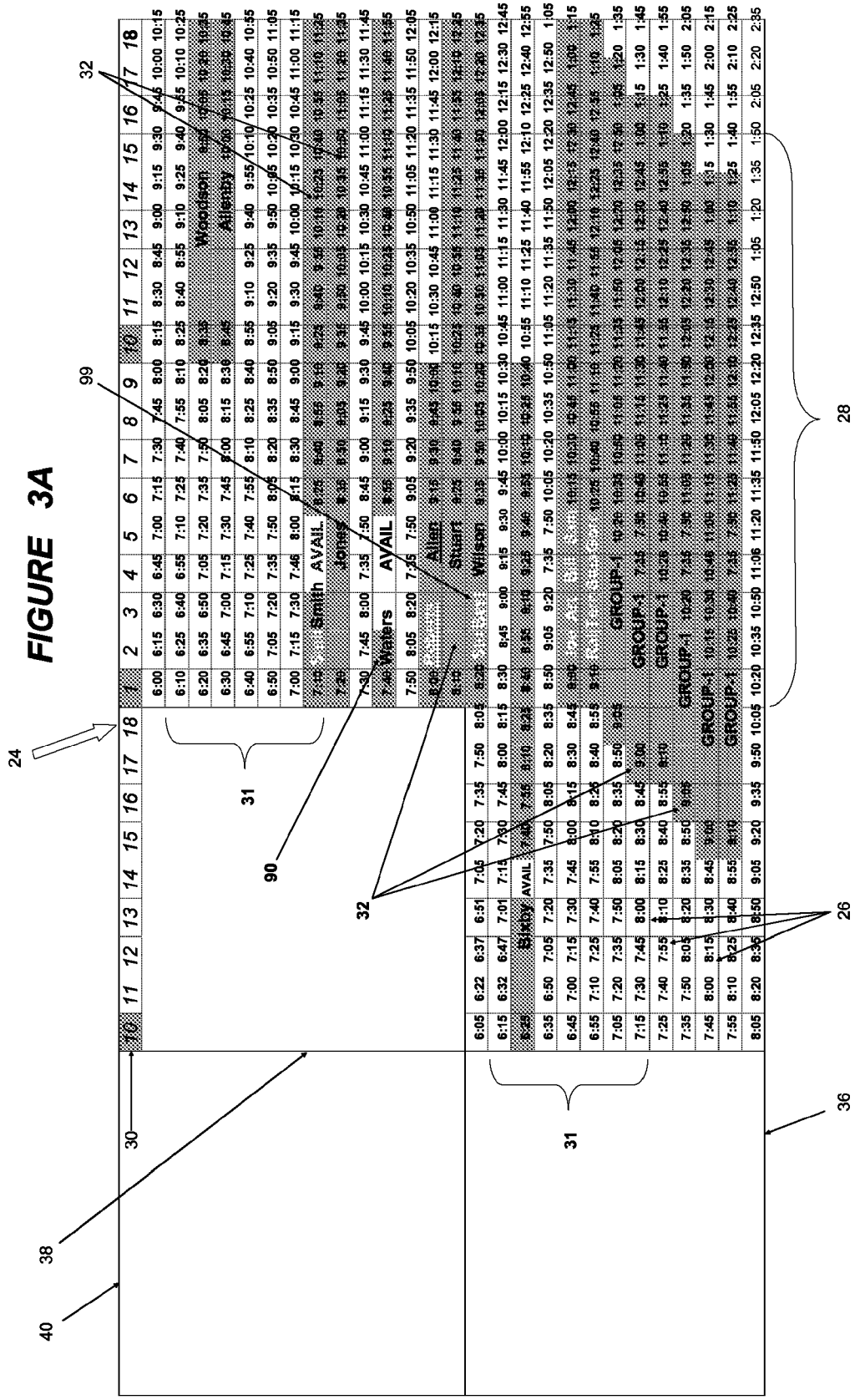
FIG. 3A is a first portion of an alternative embodiment gridded schedule in accordance with the present invention.
Figure 3B:
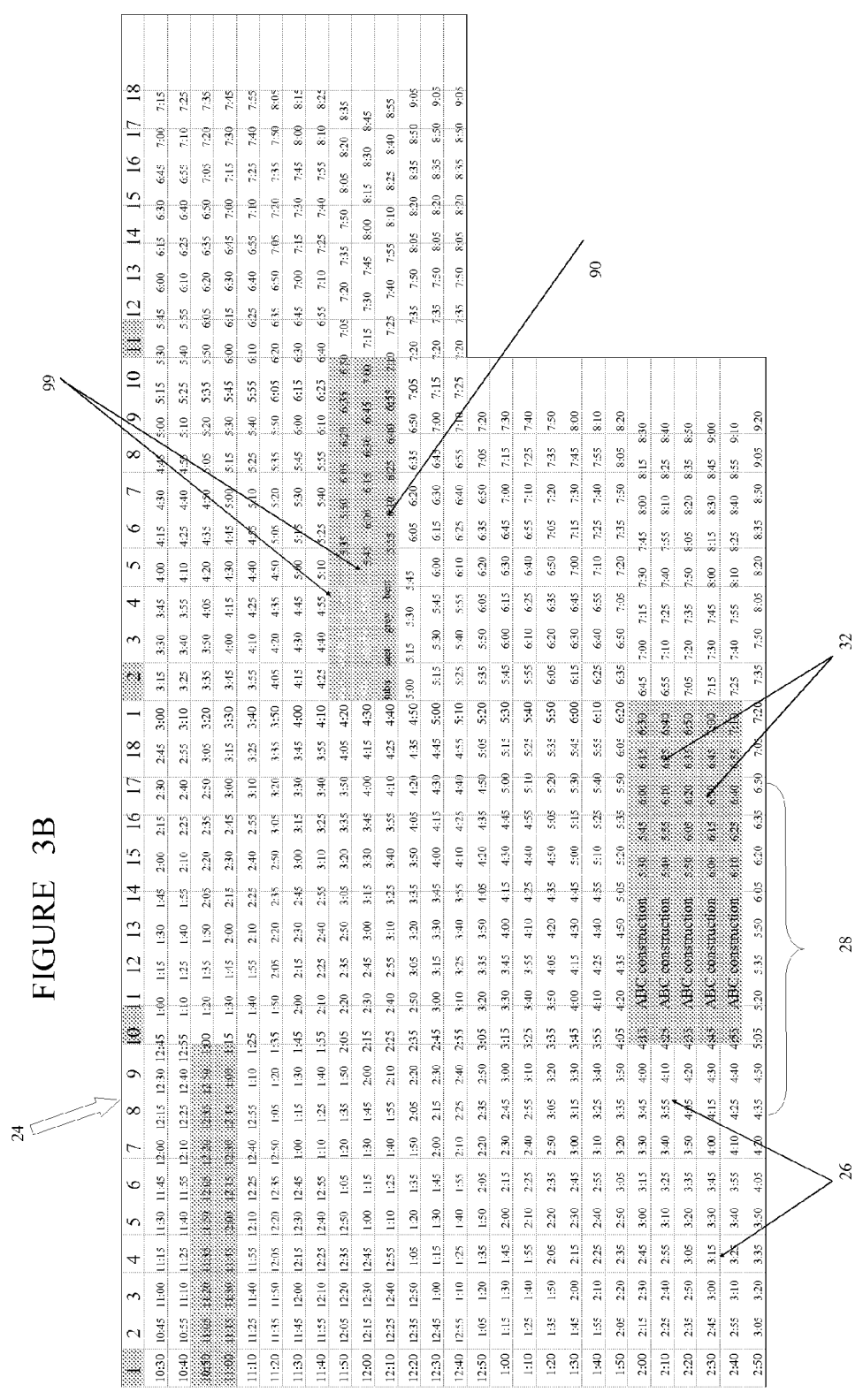
Figure 4:
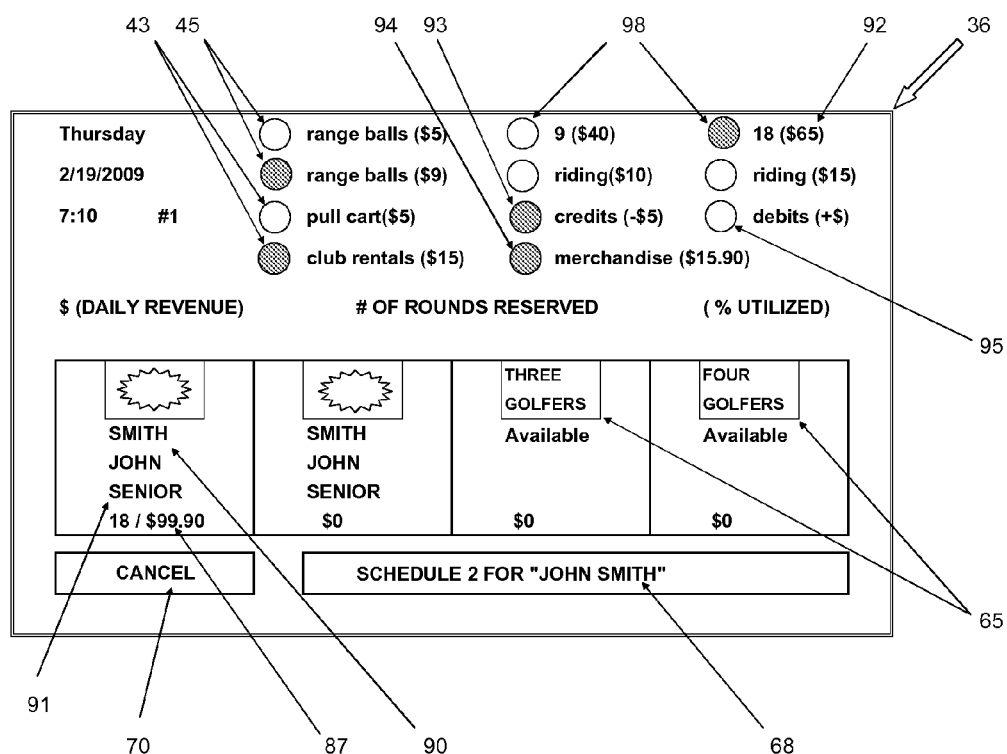

The number of holes selected for the game appears at toggle buttons 98 of reservation and check-in window 36 (FIG. 4), and may also be indicated, for example, by underlining names as in FIGS. 3A and 3B. For example, cells 26 containing golfer names under a single reservation may contain underlines 99 indicating that a certain player in the group is playing only nine holes (e.g. player "Best" listed at the 8:20 am first hole tee time of FIG. 3A). Font colors or other indicia may be applied to cells 26 containing golfer names 90 to signify in grid 24 that a given golfer has checked in and/or paid, and may be coded to signify the length of game paid for or reserved.

Once the reservation parameters are entered, the operator enters the reservation by selecting a "SCHEDULE" icon 68 in reservation and check-in window 36 (FIG. 4), at which point the new reservation appears in grid 24 with shading 32 indicating a reserved game of nine or eighteen holes. The golfer name or names 90 appear in a cell or cells 26 in grid 24 according to the number of players in the group, as described above. Optionally, system 20 may detect a conflict between the new reservation and one or more existing reservations and provide an error message and/or may prevent the conflicting new reservation from being made.

For larger groups or outings, the operator selects a first tee time at a desired hole for a subgroup and schedules a reservation for the subgroup in the same manner as for a single group, and then proceeds to select similar tee times for other subgroups at different holes along the course until the entire group or outing is reserved in smaller subgroups that all begin and end their games at approximately the same time, as described above with reference to "GROUP-1" in FIG. 3A.

Figure 15:
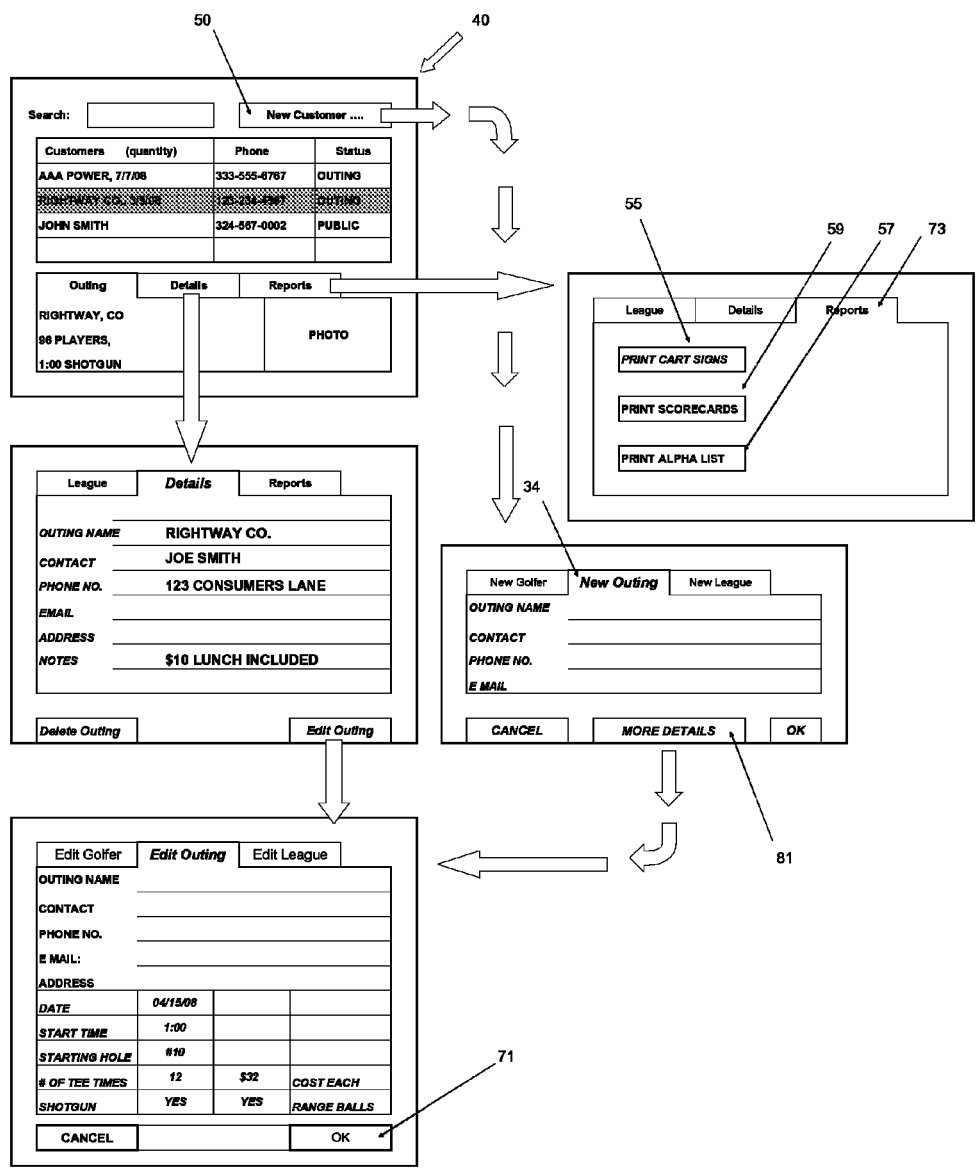
FIG. 15 is a flow chart of data entry windows in a procedure for entering names and information pertaining to golf outings.
Figure 16:
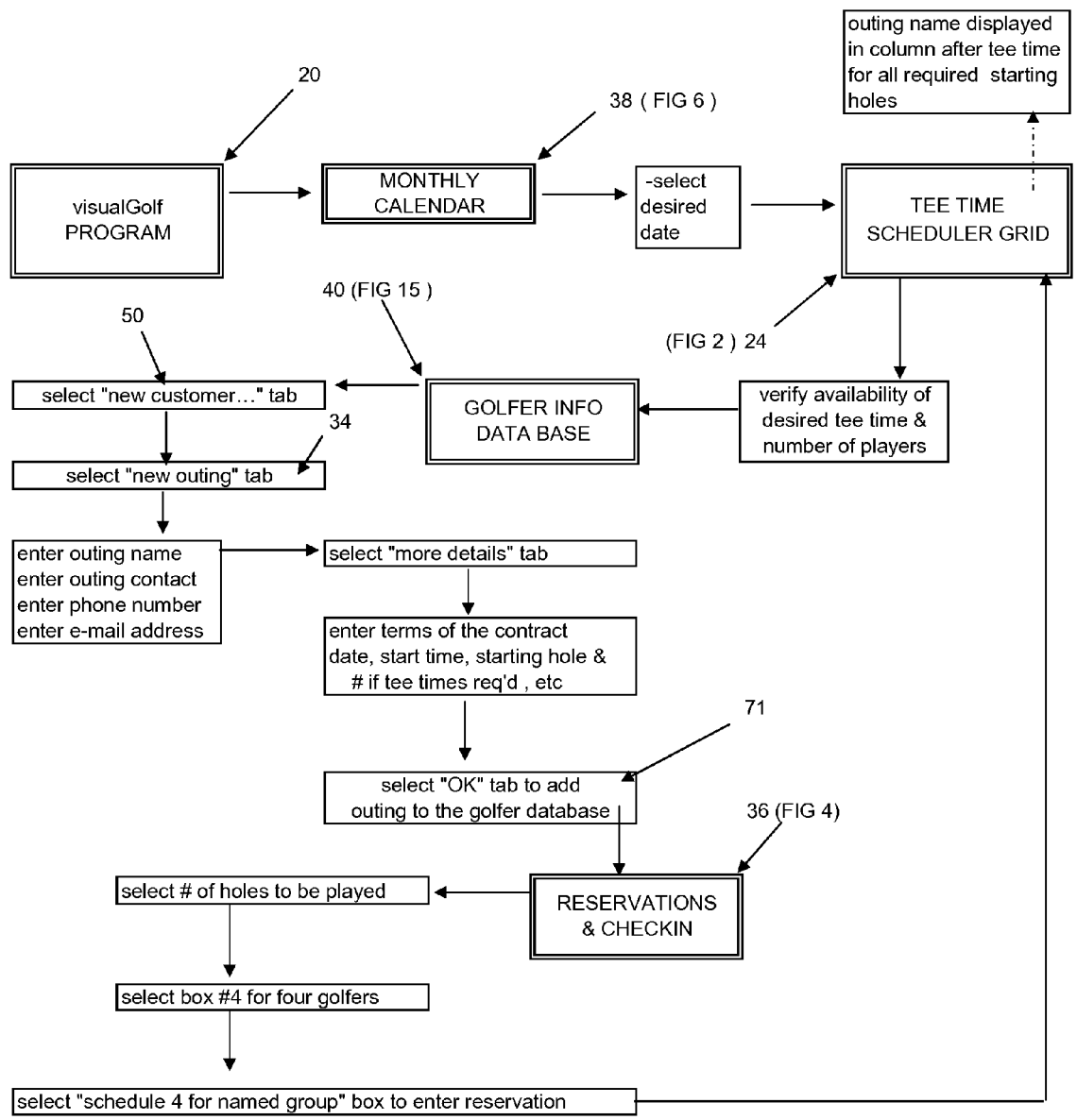
FIG. 16 is a flow chart of an outing reservation procedure.

Optionally, for larger groups of players or outings, the operator may perform a reservation procedure in accordance with the flow chart of FIG. 16. The operator selects the date of the outing from the monthly calendar 38, and then selects the contracted tee time from the tee time scheduler 24 to determine availability. In the customer database window 40 the operator selects the "NEW CUSTOMER" tab 50 and then "NEW OUTING" tab 34 (FIG. 15) wherein the outing is entered in the same manner as a golfer but with the status 91 of "outing". The operator completes the outing information by selecting the "MORE DETAILS" tab 81 and subsequently the "OK" tab 71 to enter information such as number of tee times, start date and time, hole number, number of holes, type of start, etc. into system 20. To enter the reservation in scheduler 24, the operator selects the number of players in each group in window 36 and selects "SCHEDULE" icon 68 in window 36 (FIG. 4) so that the outing name appears with shading at various holes with tee times scheduled at approximately the same time. Scheduling different hole numbers with similar tee times (i.e. "shotgun" start) is discussed above and with reference to GROUP-1 of FIG. 2A (at the 9:00 am to 9:10 am tee time).

Figure 17:
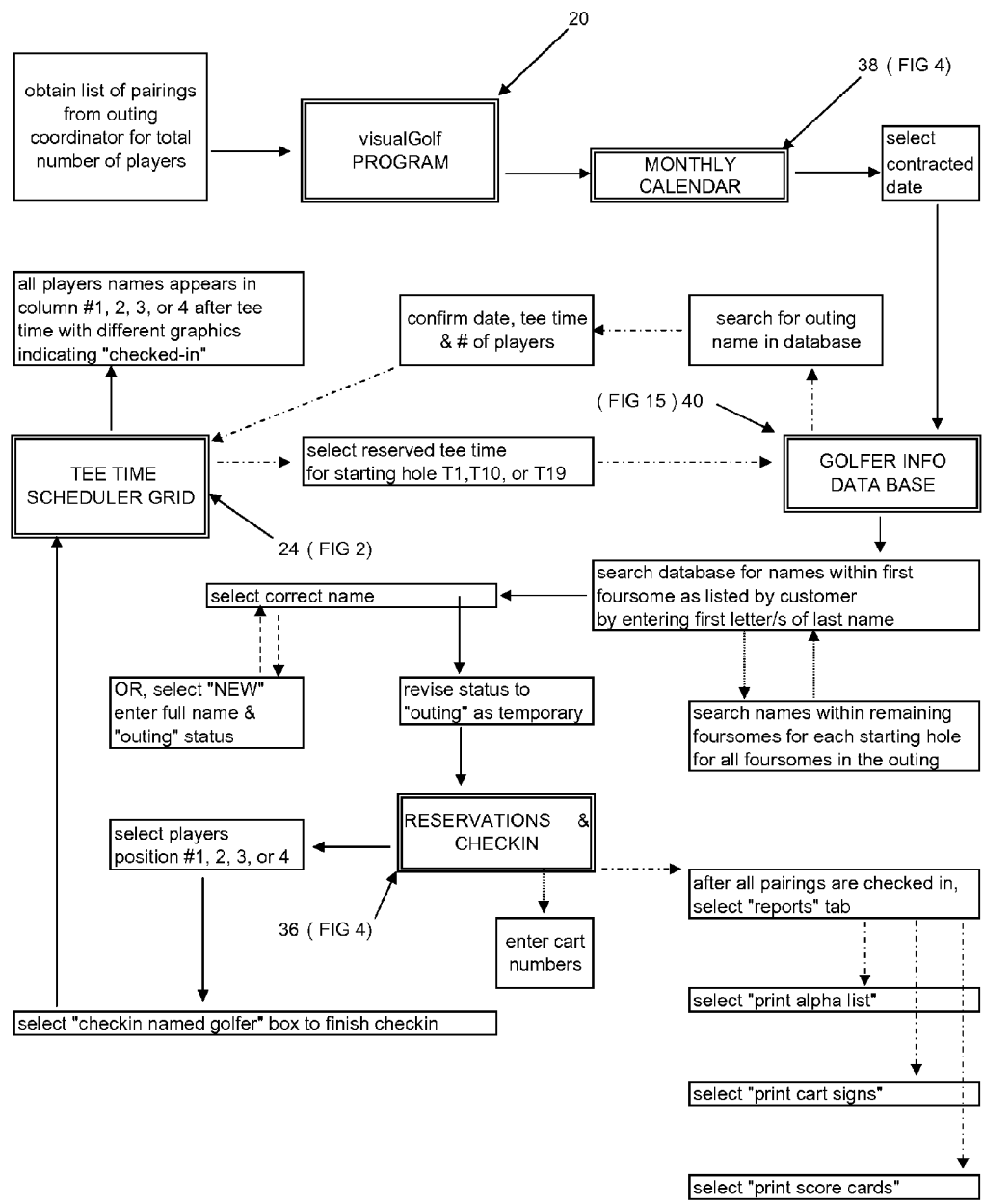
FIG. 17 is a flow chart of an outing check-in procedure.

Prior to an actual reservation date, an outing typically will provide a list of pairings or names of players in foursomes playing together in the outing. Players who are members of an outing may be checked-in according to the foursomes in accordance with the flow chart of FIG. 17. When all golfing foursomes have been checked-in, the operator may select a "REPORTS" tab 73 in the golfer list window 40 to then choose to select a "PRINT CART SIGNS" tab 55 and/or select "PRINT SCORECARDS" tab 59 and/or select a "PRINT ALPHA LIST" tab 57 for signs to use in organizing the event. Cart signs are used to identify golfers on the golf course by listing the starting hole and thereby allowing an operator to determine adherence to pace of play.

Once a reservation has been made, the reservation may be cancelled by opening grid 24 containing the reservation; selecting the reservation by its date and tee time, which moves the reservation information into reservation and check-in window 36 (FIG. 4); and selecting the "CANCEL" icon 70. A reservation may be edited or changed in a similar manner, such as by selecting the date via calendar window 38; selecting the tee time in grid 24 to display the reservation at reservation and check-in window 36 and changing the desired parameter such as the tee time, the number of holes to be played, or the player names 90; and selecting the "SCHEDULE" icon 68 in window 36. A reserved tee time may be moved or changed by selecting the tee time, selecting the "CANCEL" icon 70, selecting the new tee time, and selecting the schedule icon 68.

Figure 12:
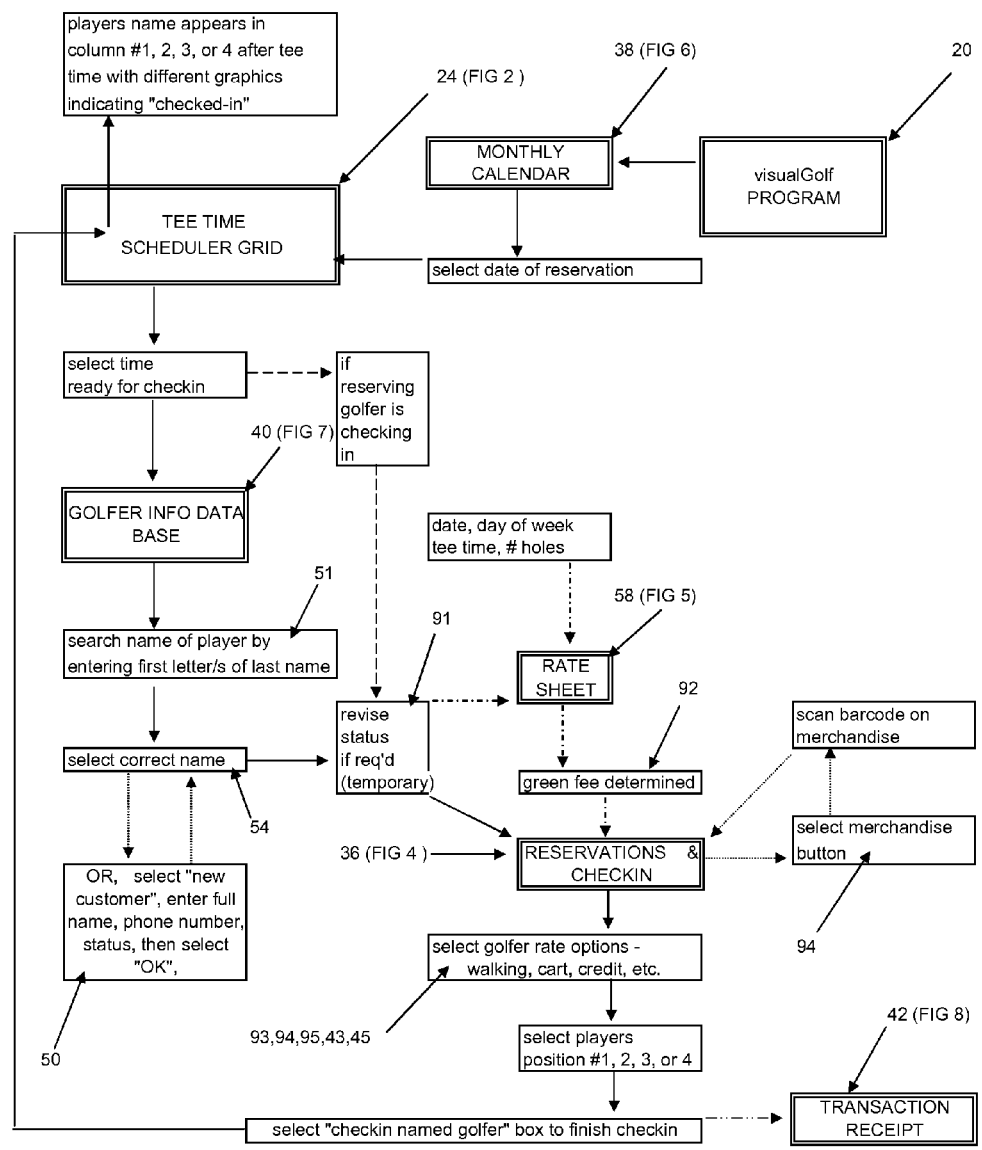
FIG. 12 is a flow chart showing a check-in data entry and merchandise sales method in accordance with the present invention.

When a member of a golf group having a reservation arrives for check-in, the operator may perform a check-in procedure and/or merchandise sales in accordance with the flow chart of FIG. 12. To check in members of a group, the operator opens grid 24 containing the reservation, selects the appropriate reservation by its tee time, and views the reservation parameters in reservation and check-in window 36. Optionally, the operator may inquire as to any desired purchases, such as golf club rentals, range balls, clothing, or equipment purchases, and enter them into window 36 such as by scanning barcodes (after selecting merchandise 94 within reservation and check-in window 36) associated with each article or rental. If the group member or members checking in are not already listed in window 36, they may be entered from golfer list window 40 or manually added to database 48 and then entered in reservation and check-in window 36. As data on additional purchases is added to the reservation during check-in, transaction summary 42 is updated to reflect the purchases, green fees 92, rentals, issued credits 93, redeemed credits 95, discounts, or other charges according to rate sheet 58, golfer status 91, and merchandise inventory chart 60.

After all charges have been tallied in reservation and check-in window 36, the operator may receive payment from the golfer in the form of cash, check, credit card, golf course account, or the like. The operator then selects "CHECK-IN" in reservation and check-in window 36, after which transaction summary 42 is printed, and the golfer is checked in for his or her reserved tee time. The number of holes selected for the game appears at toggle buttons 98 of reservation and check-in window 36, and names 90 may appear underlined 99 in cells 26 of grid 24 as described above. Optionally, in order to track and display which golfer in a group has checked in for a given reservation/transaction, a symbol or color coding may appear in the cell 26 bearing the golfer's name 90.

Businesses and other organizations often wish to organize golf leagues for their employees or members, such as for an after-work activity. These highly competitive and structured golf events occur on predetermined tee times on a given day of the week for several weeks of the year. Usually these leagues are for a set number of tee times that are typically the same for each week. Reservations for leagues may be performed by an operator in accordance with the flow charts of FIGS. 18 and 19. The operator searches the golfer list window 40 (FIG. 18) for the name of the league. If the league is new, the operator enters the name of the league and other information such as phone number and contact person, then selects "MORE DETAILS" 81 to enter terms of the contract such as number of tee times 88, number of weeks 80, starting date 84, starting hole 86 and starting time 85. For existing leagues in the database, the operator simply chooses "DETAILS" 76 from window 40 (FIG. 15) and then "EDIT LEAGUE" 83 to revise contract terms such as number of tee times, number of weeks, starting date, starting hole and starting time before selecting "OK" to enter. The reservation is complete when operator selects check-in window 36 (FIG. 4) and selects box 65 for 4 golfers and then selects "SCHEDULE" icon 68 in window 36. Reservations can be scheduled for the entire year based on total number of weeks and may be alternated between starts on hole one and hole ten from week to week with shading and league name in cells 26 of grid 24.

Figure 18:
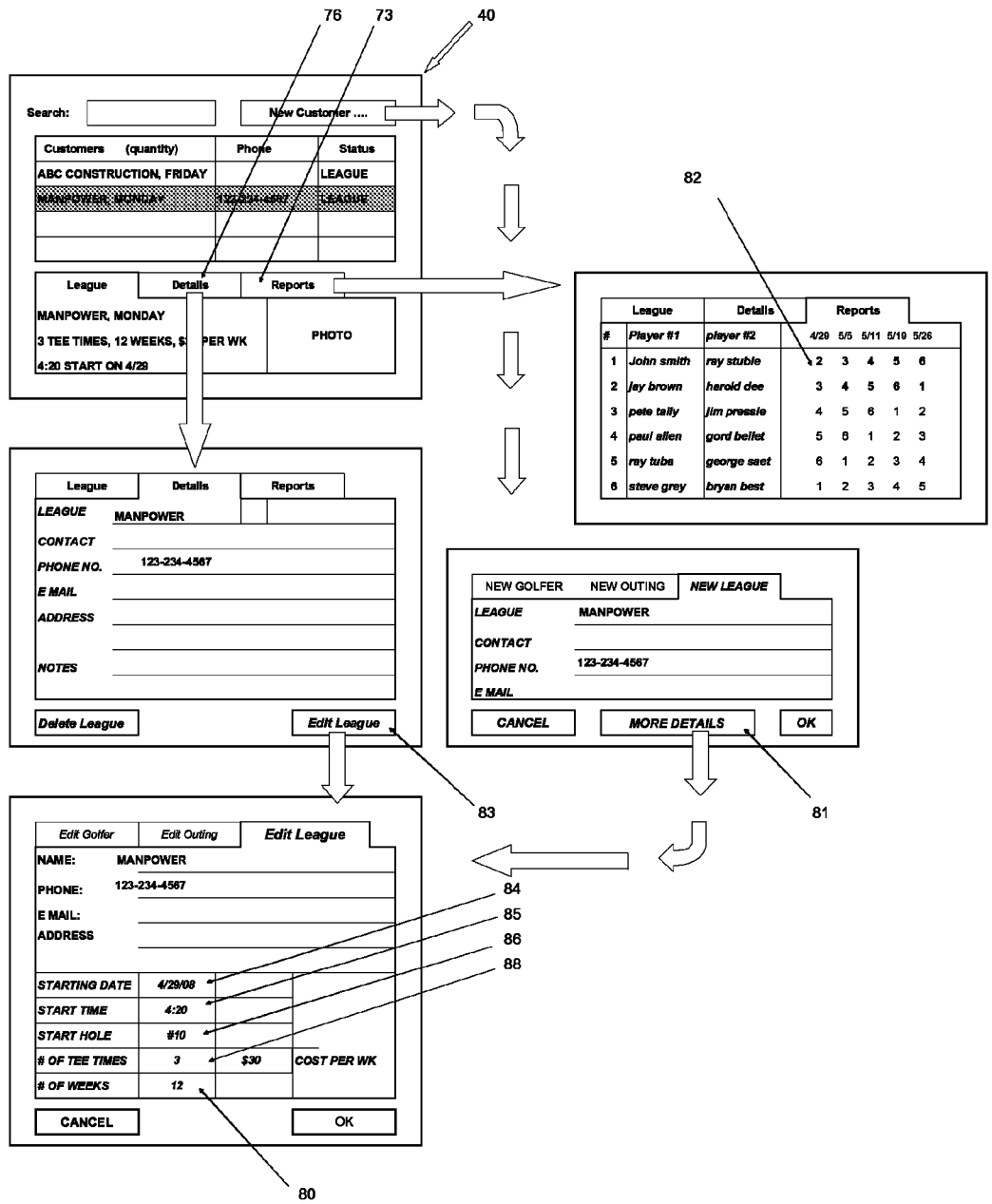
FIG. 18 is a flow chart of data entry windows in a procedure for entering names and information pertaining to golf leagues.
Figure 19:
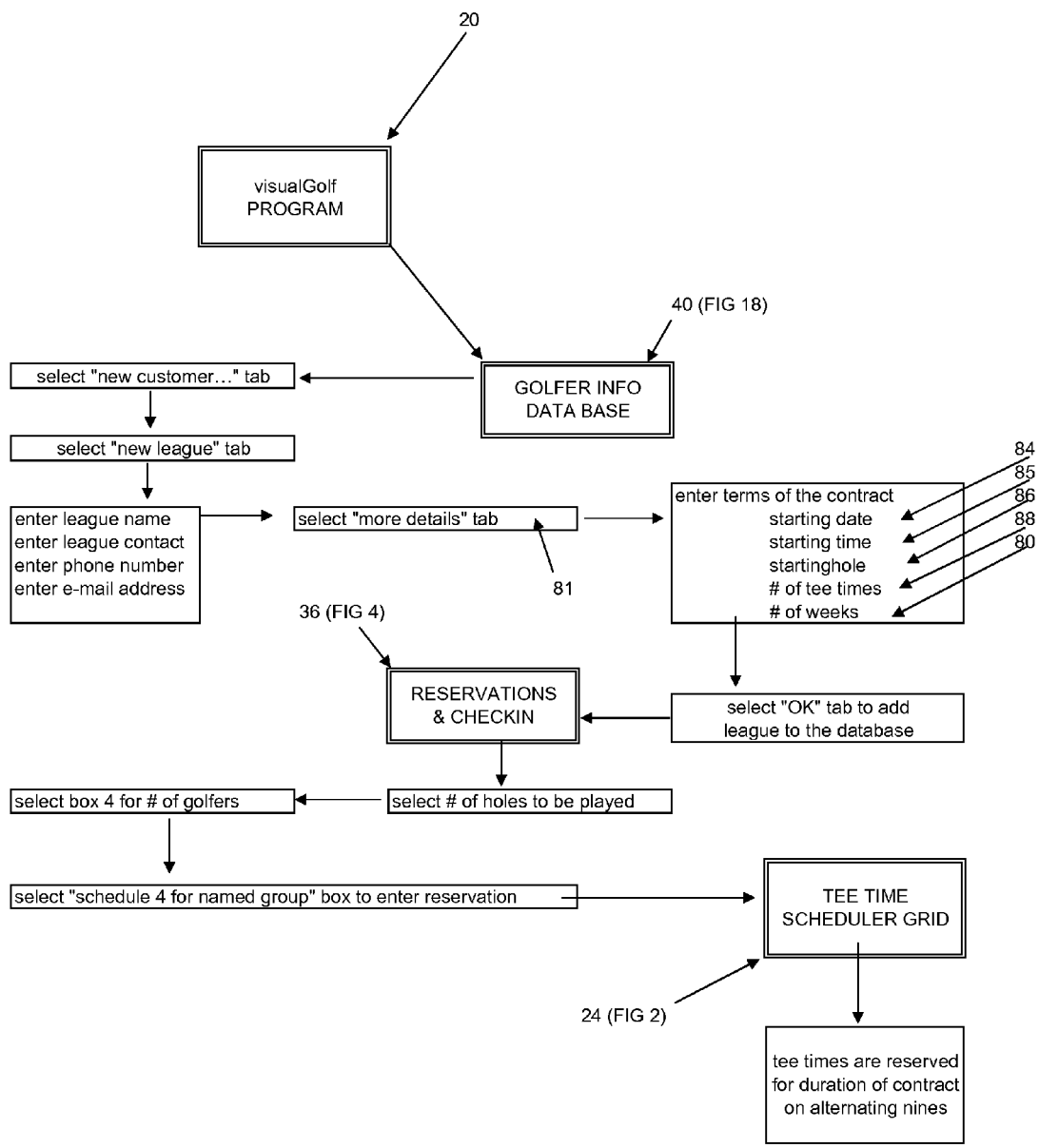
FIG. 19 is another flow chart of a league setup procedure.
Figure 20:
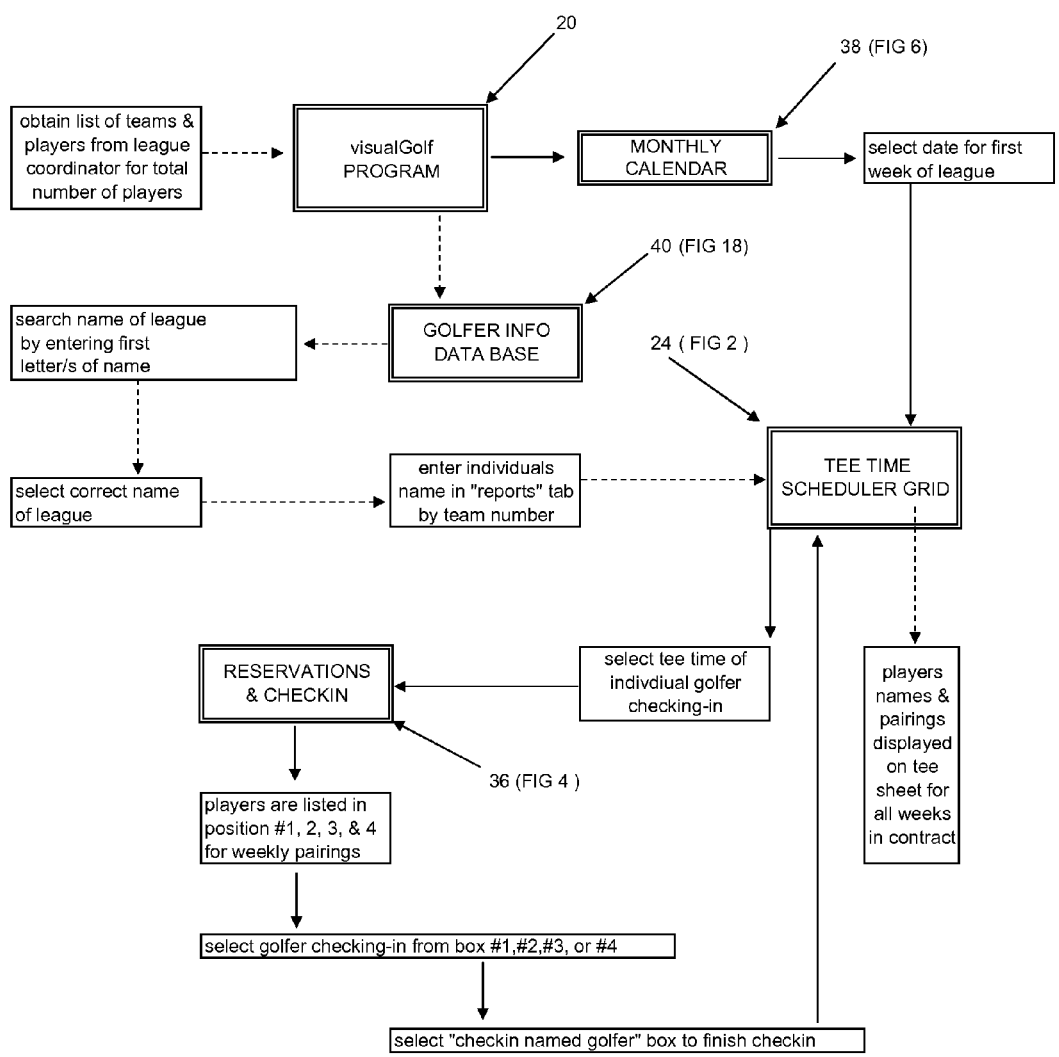
FIG. 20 is a flow chart of a league check-in procedure.

Checking in golfers for leagues is performed by the operator in accordance with the flow chart of FIG. 20. Prior to the first reservation date, team numbers and respective players' names may be submitted to the operator. League names are searched in golfer database 40 and the "REPORTS" tab 73 is selected for entering players' names. Players' names are entered according to team numbers wherein a pairings schedule 82 is developed for the duration of the league contract (FIG. 18). Grid 24 then shows the names of the players (rather than the league name) at their actual tee time. As players are checked-in (paid) from window 36, their names may be indicated with different color or style of font as having checked-in, while name position indicates their partner and opponents from week to week.

Figure 13A:
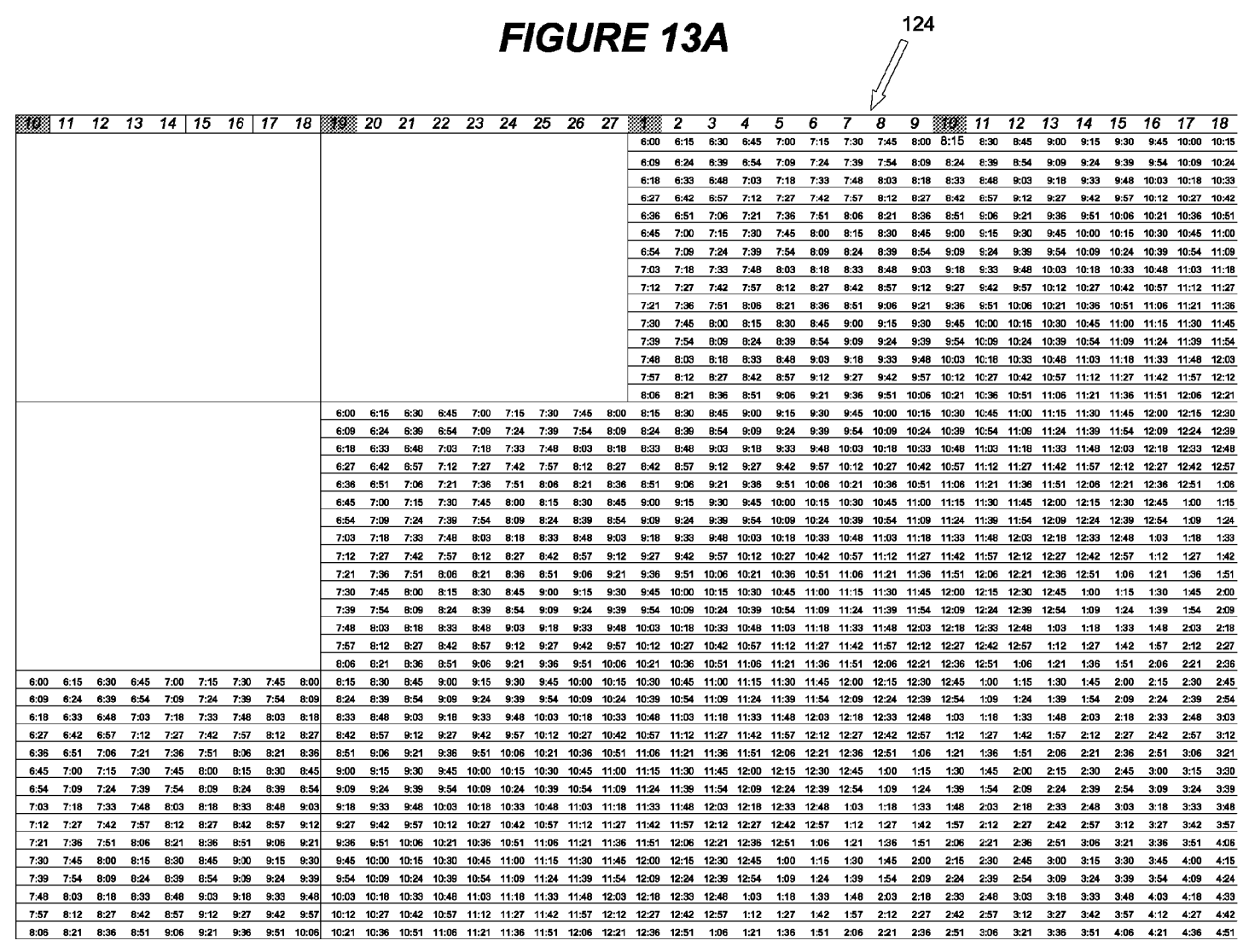
Figure 13B:
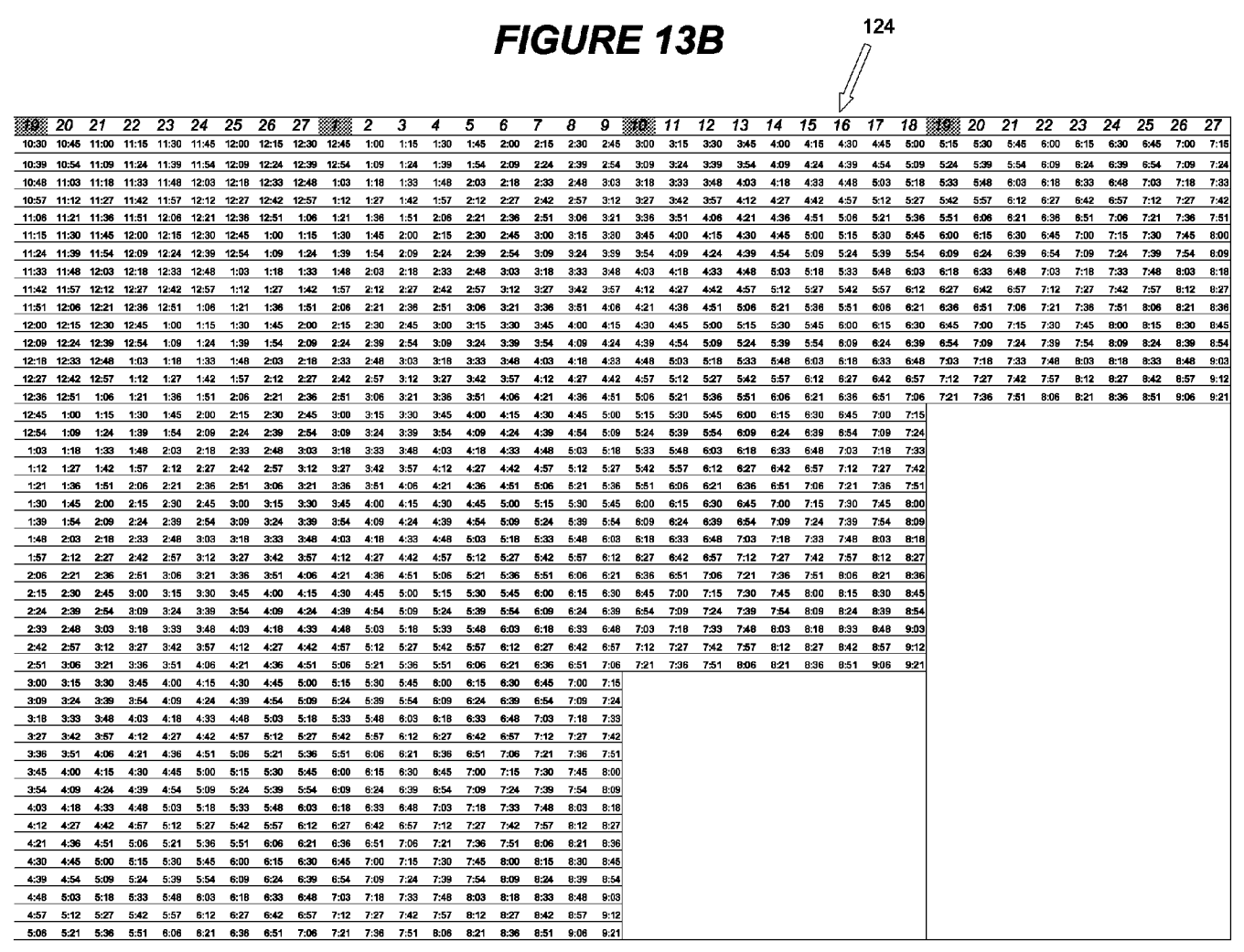

Optionally, a grid 124 accommodates a golf course having twenty-seven holes available for play (FIGS. 13A and 13B). For example, a first portion of grid 124 (FIG. 13A) may include early tee times for hole numbers one, ten, and nineteen so that the operator may schedule games of nine holes, eighteen holes, or twenty-seven holes beginning on the first, tenth, or nineteenth hole. Optionally, such as for large groups or outings, subgroups may be scheduled for any available tee time at any available hole. A second portion of grid 124 (FIG. 13B) lists later tee times that begin on hole ten, hole nineteen, or hole one. Thus, grid 124 accommodates a golf course having twenty-seven holes of play in a similar manner as grid 24 for a golf course having eighteen holes such that a detailed discussion of the scheduling and shading of grid 124 need not be repeated.

Figure 14:
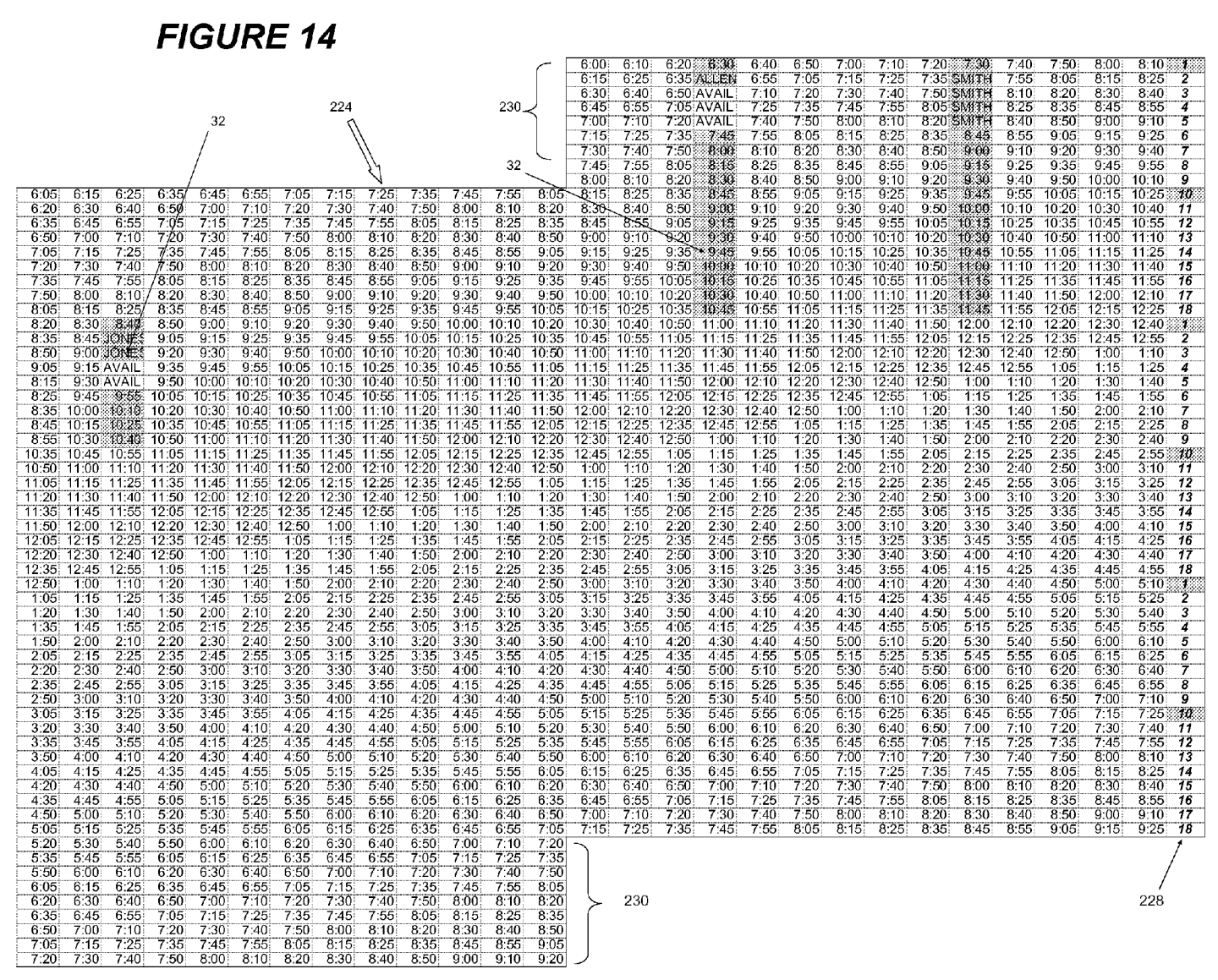

Optionally, and with reference to FIGS. 14A and 14B, a reversed grid 224 may be oriented with a vertical column 228 displaying hole numbers and horizontal rows 230 displaying tee times. Grid 224 is shaded vertically to indicate golf course occupancy by a given group, rather than horizontally as in grid 24. Grid 224 functions in substantially the same way as grid 24 and grid 124, with the exception of the reversed hole numbers and tee times, such that a detailed discussion of the scheduling and shading of grid 224 need not be repeated.

Optionally, system 20 may be implemented over the Internet 72 with personal computers 74 (FIG. 1), or with reservation and check-in kiosks so that golfers can view their golf course's schedule, place reservations for themselves, and/or check themselves in. Player-reserved reservations may be implemented with password access, pre-payment requirements, and other limitations, for example. Optionally, global positioning systems (GPS) or other tracking devices such as radio telemetry may be used on the golf course and golf carts to monitor actual or real-time progress of golfers associated with a particular reservation along the golf course and displayed on grid 24. Thus, electronic monitors or sensors 77 positioned along the course may permit the tracking of actual tee times for display on grid 24 and monitoring by a user or operator of system 20. Optionally, wireless handheld devices 75 may be used by operators to enable their use of up-to-date reservation and check-in information while the operators themselves are located remotely from system 20.

The software architecture of golf course time management system 20 may be implemented using software architecture such as the Adobe FLEX® application, and the graphical user interface implemented using the Adobe FLASH® version 9 Framework application. Programming may be developed using Adobe ACTIONSCRIPT® code with various open-source components and modules. The application may be compiled to run on platforms such as Macintosh or Windows operating systems utilizing substantially any post-2006 web browser with an Adobe FLASH® browser plugin. Alternatively, the application may be compiled to run independent of a web browser, such as by using Adobe AIR® framework for a desktop computer. According to one embodiment, the application uses the Internet Protocol (IP) to communicate, over a network, between any combination of either the main golf course time management system servers, the on-site golf course time management system servers, or the on-site golf course workstation (such as computer or terminal 62). The servers may run using the Apache Web Server, PHP open-source protocol programming language and MySQL® database architecture to store and retrieve data.

It will be understood by those skilled in the art that system 20 may have other applications for games or other tasks that require the distribution or allocation of one member or group or resource at one of a plurality of locations, and is not intended to be limited in scope to the scheduling of golf games.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A computer-implemented golf course reservation system comprising:
    a computer;
    a computer database that stores golf course reservation data, said computer database being accessible by said computer;
    said computer defining input fields, at least one of said input fields for receiving a user input selection of golf reservation parameters for a player, the golf reservation parameters including at least a starting time and a starting hole for a golf game to be reserved for the player;
    a user interface, said user interface for entering the user input of the golf reservation parameters into the input fields;
    a display, said display for visually displaying designators generated by said computer, said display including a grid arranged according to golf hole designators and time designators corresponding to the golf hole designators;
    a computer program accessible by said computer, said computer program for calculating and creating a graphical display of expected future occupancy of a golf course based on the golf reservation parameters input into the input fields; and
    wherein said display displays the expected future occupancy of the golf course by the player throughout substantially the entire duration of the golf game reserved for that player by displaying a visual designator at each of said golf hole designators and said corresponding time designators of said grid that corresponds to an estimated time of day at which each portion of the golf course will be occupied by the player.

2. The reservation system according to claim 1, further comprising a merchandise sales system, said merchandise sales system for compiling a sales transaction.

3. The reservation system according to claim 2, wherein the sales transaction comprises at least one of green fees, golf club rental, range ball fees, equipment sales, and clothing sales.

4. The reservation system according to claim 1, wherein said golf reservation parameters comprise identification data, start-time data, game-duration data, and start-hole data.

5. The reservation system according to claim 4, wherein said golf reservation parameters comprise the number of players in a group.

6. The reservation system according to claim 1, further comprising a second display, said second display visually displaying said designators generated by said computer, said second display including said grid.

7. The reservation system according to claim 6, wherein said displays are operable to visually display expected future occupancy of the golf course corresponding to at least one full day.

8. The reservation system according to claim 1, wherein at least one of said input fields receives a user input selection of merchandise parameters for a customer.

9. The reservation system according to claim 1, wherein said visual designators comprise shading.

10. In a computer-implemented reservation system, a method for tracking and displaying golf reservations, said method comprising:
    providing a computer and a computer database including golf course reservation data accessible by said computer;
    providing a display accessible by said computer, said display including a grid, said grid including tee times corresponding to golf hole numbers for at least one day;
    displaying a reservation designator at said display with said computer, said reservation designator including an identifier for identifying one or more players, a start time, and a start hole;
    positioning said reservation designator at said grid, with said computer, in a position corresponding to the start time and further corresponding to the start hole;
    estimating with said computer the duration of a game corresponding to said reservation designator; and
    displaying the reservation designator at said grid with said computer, the reservation designator corresponding to the estimated duration of the game, wherein said computer, via said display, provides a user with a visual display indicative of a predicted location of the one or more players at a specific time of day following the start time of the game corresponding to the reservation designator.

11. The method according to claim 10, wherein the reservation designator comprises one of shading, lines, altered text font, and colors in the grid.

12. The method according to claim 10, further comprising:
    providing a database including golfer information, said golfer information comprising name data; and
    populating the reservation designator with name data from said database.

13. The method according to claim 12, further comprising:
    providing said golfer information comprising golfer status data;
    providing green fees data; and
    calculating total fee data from said golfer status data and said green fees data.

14. The method according to claim 12, further comprising:
    providing merchandise data;
    recording merchandise purchases by the one or more players; and
    calculating total fee data from said golfer status data, said green fees data, and said merchandise purchases.

15. The method according to claim 10, wherein said providing a display including a grid, said grid including tee times corresponding to golf hole numbers for at least one day comprises adjusting said tee times according to sunrise time and sunset time of the at least one day.

16. The method according to claim 10, further comprising:
   entering a new golf game reservation that conflicts with said reservation block time designator; and
   displaying a warning message at said display.

17. A computer-implemented golf course reservation system comprising:
   a computer;
   a computer database for storing golf course reservation data, said computer database being accessible by said computer;
   said computer defining input fields, at least one of said input fields for receiving a user input selection of golf reservation parameters for a player, the golf reservation parameters including at least a starting time and a starting hole for a golf game to be reserved for the player;
   a user interface, said user interface for entering user input of the golf reservation parameters into the input fields;
   a display, said display for visually displaying designators generated by said computer, said display including a grid organized according to golf hole designators that are arranged generally horizontally, and further organized according to time designators corresponding to and arranged below the golf hole designators;
   a computer program accessible by said computer, said computer program for calculating and creatin a graphical display of expected future occupancy of a golf course based on the golf reservation parameters input into the input fields; and
   wherein said display is operable to display the expected future occupancy of the golf course by the player throughout substantially the entire duration of the golf game reserved for that player, by displaying a visual designator at each of said golf hole designators and said corresponding time designators of said grid that corresponds to an estimated time of day at which each portion of the golf course will be occupied by the player.

18. The reservation system according to claim 17, wherein said visual designator comprises shading.

19. The reservation system according to claim 17, wherein said display is operable to simultaneously display expected future occupancy of the golf course corresponding to at least one full day.

20. The reservation system according to claim 17, wherein at least one of said input fields receives a user input selection of merchandise parameters for a customer.

21. In a computer-implemented reservation system, a program stored on a non-transitory computer readable medium for presenting selected golf course schedule information for a golf course on a display, said program comprising:
   code that receives reservation data from user-accessible input fields at the display, and stores the data in a computer database that is accessible by a computer, the data being entered into the input fields via a user interface in communication with the computer and the input fields including player identification data and golf reservation parameters, the golf reservation parameters including at least a starting time and a starting hole for a golf game to be reserved for a player corresponding to the player identification data;
   code that is implemented on the computer to define a golf course schedule as a grid on the display, the grid arranged according to golf hole designators and time designators; and
   code that is implemented on the computer to process the reservation data into a golf course occupancy parameter to form visual designators at each of the golf hole designators and corresponding time designators of the grid on the display, with at least one visual designator corresponding to each time at which each hole of the golf course will be occupied by at least one player throughout an entire day based solely on the golf reservation parameters.

22. The program of claim 21, wherein the visual designators comprise player names.

23. The program of claim 22, wherein the visual designators further comprise shading.

24. The program of claim 21, including code that is implemented on the computer to display golf hole numbers as golf hole designators and code that displays tee times as time designators.

25. The program of claim 24, including code that displays golf hole numbers arranged in horizontal rows and displays tee times in vertical columns.

* * * * *

UNITED STATES PATENT AND TRADEMARK OFFICE
CERTIFICATE OF CORRECTION

PATENT NO. : 7,953,617 B2  
APPLICATION NO. : 12/368596  
DATED : May 31, 2011  
INVENTOR(S) : Smeenge et al.

It is certified that error appears in the above-identified patent and that said Letters Patent is hereby corrected as shown below:

Column 15
Line 28 "creatin" should be "creating"

Signed and Sealed this
Twelfth Day of March, 2013

Teresa Stanek Rea
*Acting Director of the United States Patent and Trademark Office*